(12) United States Patent
Munoz et al.

(10) Patent No.: US 8,374,234 B2
(45) Date of Patent: Feb. 12, 2013

(54) DIGITAL SCALING

(76) Inventors: Francis S. J. Munoz, Calgary (CA);
Vadym P. Babich, Calgary (CA);
Stephen R. Campbell, Burnaby (CA)

( * ) Notice: Subject to any disclaimer, the term of this patent is extended or adjusted under 35 U.S.C. 154(b) by 1578 days.

(21) Appl. No.: 11/775,082

(22) Filed: Jul. 9, 2007

(65) Prior Publication Data
US 2008/0080614 A1 Apr. 3, 2008

Related U.S. Application Data

(60) Provisional application No. 60/827,675, filed on Sep. 29, 2006.

(51) Int. Cl.
*H04N 11/04* (2006.01)

(52) U.S. Cl. ............ 375/240.01; 375/240; 375/240.24; 375/240.12; 375/240.15; 375/240.18; 382/298; 382/276; 382/239; 345/666; 345/660; 345/667; 704/500

(58) Field of Classification Search ......................... None
See application file for complete search history.

(56) References Cited

U.S. PATENT DOCUMENTS

| | | | |
|---|---|---|---|
| 3,818,443 A | | 6/1974 | Radcliffe, Jr. |
| 4,035,769 A | | 7/1977 | Sternberg et al. |
| 4,127,873 A | | 11/1978 | Katagi |
| 4,456,877 A | | 6/1984 | Brown |
| 4,585,947 A | | 4/1986 | Liptay-Wagner et al. |
| 5,134,480 A | | 7/1992 | Wang et al. |
| 5,159,642 A | | 10/1992 | Kosaka |
| 5,197,127 A | | 3/1993 | Waclawsky et al. |
| 5,459,837 A | | 10/1995 | Caccavale |
| 5,483,468 A | | 1/1996 | Chen et al. |
| 5,771,105 A | * | 6/1998 | Rust et al. ................. 358/2.99 |
| 5,852,681 A | * | 12/1998 | Amaratunga et al. ......... 382/268 |
| 5,889,895 A | * | 3/1999 | Wong et al. .................. 382/300 |
| 5,915,230 A | | 6/1999 | Berne et al. |
| 6,075,926 A | | 6/2000 | Atkins et al. |

(Continued)

FOREIGN PATENT DOCUMENTS

| EP | 0 875 735 A1 | 11/1998 |
|---|---|---|
| EP | 1 408 420 A1 | 4/2004 |

(Continued)

OTHER PUBLICATIONS

ISR including PCT transmittal and PCT Written Opinion, From the International Searching Authority, mailed May 30, 2008, Applicant: Crystal Signal Inc., International Application No. PCT/IB2007/003941, pp. 13.

(Continued)

*Primary Examiner* — Syed A. Zia
(74) *Attorney, Agent, or Firm* — Schubert Law Group PLLC

(57) ABSTRACT

Computer program products and arrangements to process digital data are contemplated. The digital data may contain values, representing quantities of a wave form over regions. Embodiments include transformations, code, state machines or other logic to process digital data by dividing one of the regions, where one of the values represents a quantity of a wave form over the region. The embodiments may include assigning a value to each of the subregions. The average of the values of the subregions, weighted by the measures of the subregions, may approximately equal the value of the region. The regions may comprise pixels and the values of the pixels may represent the intensity of light waves over the pixels. The embodiments may include the processing of digital data in cameras, televisions, audio players, seismic devices, and medical imaging devices. The subdivision of regions and the assignment of value to the subregions may utilize derivative migration.

32 Claims, 12 Drawing Sheets

U.S. PATENT DOCUMENTS

| | | | |
|---|---|---|---|
| 6,215,916 B1 * | 4/2001 | Acharya | 382/298 |
| 6,219,465 B1 * | 4/2001 | Nacman et al. | 382/300 |
| 6,348,929 B1 * | 2/2002 | Acharya et al. | 345/660 |
| 6,369,787 B1 * | 4/2002 | Wu et al. | 345/87 |
| 6,385,548 B2 | 5/2002 | Ananthaiyer et al. | |
| 6,396,607 B1 * | 5/2002 | Cao | 398/154 |
| 6,476,824 B1 | 11/2002 | Suzuki et al. | |
| 6,483,605 B1 * | 11/2002 | Lu et al. | 358/1.2 |
| 6,498,868 B1 * | 12/2002 | Klassen | 382/298 |
| 6,570,613 B1 | 5/2003 | Howell | |
| 6,603,888 B1 * | 8/2003 | Kikuchi et al. | 382/300 |
| 6,606,408 B1 * | 8/2003 | Kang et al. | 382/164 |
| 6,622,101 B1 | 9/2003 | Oechsner et al. | |
| 6,836,519 B1 * | 12/2004 | Gerlach et al. | 375/345 |
| 6,859,814 B2 | 2/2005 | Kiriaki | |
| 7,010,060 B2 | 3/2006 | Ledvina et al. | |
| 7,016,814 B2 | 3/2006 | Beerends et al. | |
| 7,050,656 B2 * | 5/2006 | Bhaskaran et al. | 382/298 |
| 7,149,369 B2 * | 12/2006 | Atkins | 382/299 |
| 7,190,288 B2 | 3/2007 | Robinson et al. | |
| 7,194,032 B1 * | 3/2007 | Easwar et al. | 375/240.12 |
| 7,263,142 B2 | 8/2007 | Kim et al. | |
| 7,268,916 B2 * | 9/2007 | Kokemohr et al. | 358/1.9 |
| 7,428,282 B2 | 9/2008 | Sommer | |
| 7,706,635 B2 * | 4/2010 | Keithley et al. | 382/299 |
| 7,783,105 B2 * | 8/2010 | Moore et al. | 382/167 |
| 8,098,730 B2 * | 1/2012 | Ma et al. | 375/240.16 |
| 2002/0106026 A1 * | 8/2002 | Demmer | 375/240.17 |
| 2003/0117507 A1 | 6/2003 | Kehtarnavaz et al. | |
| 2004/0008269 A1 | 1/2004 | Zomet et al. | |
| 2004/0114812 A1 * | 6/2004 | Bhaskaran et al. | 382/233 |
| 2004/0165784 A1 * | 8/2004 | Xie et al. | 382/254 |
| 2005/0001831 A1 | 1/2005 | Shih et al. | |
| 2005/0011249 A1 | 1/2005 | Mahaffey et al. | |
| 2005/0096866 A1 | 5/2005 | Shan et al. | |
| 2005/0129316 A1 * | 6/2005 | Curti et al. | 382/224 |
| 2005/0143927 A1 | 6/2005 | Cammia et al. | |
| 2006/0088228 A1 * | 4/2006 | Marriott et al. | 382/305 |
| 2006/0116531 A1 | 6/2006 | Wonders et al. | |
| 2006/0274976 A1 * | 12/2006 | Hentschel | 382/300 |
| 2007/0047814 A1 * | 3/2007 | Yamazaki | 382/176 |
| 2007/0250768 A1 * | 10/2007 | Funakami et al. | 715/521 |
| 2008/0055338 A1 * | 3/2008 | Wei et al. | 345/667 |

FOREIGN PATENT DOCUMENTS

| | | |
|---|---|---|
| WO | WO 03/046774 A2 | 6/2003 |
| WO | WO 2005/057463 A1 | 6/2005 |

OTHER PUBLICATIONS

Pauli Lallo, "Signal Classification by Discrete Fourier Transform," Military Communications Conference Proceedings, 1999, MILCOM 1999. IEEE, vol. 1, pp. 197-201, Atlantic City, NJ, USA, pp. 1-5.

Paolo Prandoni et al., "Perceptually Hidden Data Transmission over Audio Signals," Acoustics, Speech, and Signal Processing, 1998, ICASSP '98. Proceedings of the 1998 IEEE International Conference, Publication date: May 12-15, 1998, Seattle, WA, USA, vol. 6 on pp. 3665-3668.

* cited by examiner

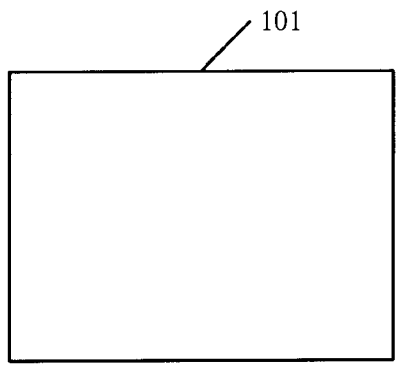
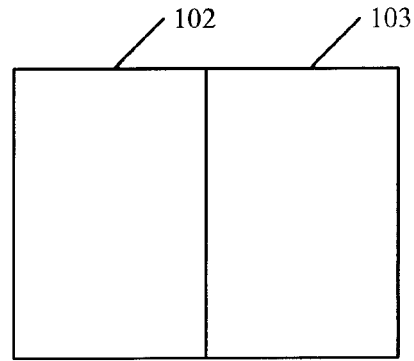
FIG. 8A                FIG. 8B
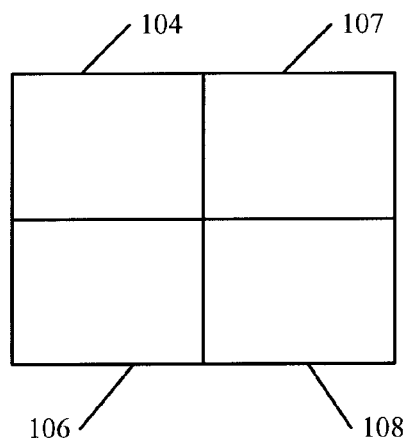
FIG. 8C

DERIVATIVE MIGRATION 1100

| ROW | A | B | C | INFLECTION POINT | IP VALUE | LEFT INTERVAL | RIGHT INTERVAL | TOTAL |
|---|---|---|---|---|---|---|---|---|
| 1 | 1 | 1 | 3 | 1 | 1 | 1 | 1 | 2 |
| 2 | 1 | 3 | 3 | -1 | 3 | 3 | 3 | 6 |
| 3 | 4 | 1 | 4 | 0 | -1/2 | 1 | 1 | 2 |
| 4 | 5 | 1 | 5 | 0 | -1 | 1 | 1 | 2 |
| 5 | 6 | 1 | 6 | 0 | -3/2 | 1 | 1 | 2 |
| 6 | 7 | 1 | 7 | 0 | -2 | 1 | 1 | 2 |
| 7 | 8 | 1 | 8 | 0 | -5/2 | 1 | 1 | 2 |
| 8 | 9 | 1 | 9 | 0 | -3 | 1 | 1 | 2 |
| 9 | 1 | 2 | 4 | 1/2 | 17/8 | 41/24 | 55/24 | 4 |
| 10 | 1 | 2 | 5 | 2/3 | 13/6 | 17/10 | 23/10 | 4 |
| 11 | 1 | 2 | 6 | 3/4 | 35/16 | 95/56 | 129/56 | 4 |
| 12 | 1 | 2 | 7 | 4/5 | 11/5 | 61/36 | 83/36 | 4 |
| 13 | 1 | 2 | 8 | 5/6 | 53/24 | 149/88 | 203/88 | 4 |
| 14 | 1 | 2 | 9 | 6/7 | 31/14 | 22/13 | 30/13 | 4 |
| 15 | 1 | 2 | 10 | 7/8 | 71/32 | 203/120 | 277/120 | 4 |
| 16 | 1 | 2 | 11 | 8/9 | 20/9 | 115/68 | 157/68 | 4 |
| 17 | 1 | 2 | 12 | 9/10 | 89/40 | 257/152 | 351/152 | 4 |
| 18 | 1 | 2 | 13 | 10/11 | 49/22 | 71/42 | 97/42 | 4 |
| 19 | 4 | 2 | 1 | -1/2 | 17/8 | 55/24 | 41/24 | 4 |
| 20 | 5 | 2 | 1 | -2/3 | 13/6 | 23/10 | 17/10 | 4 |
| 21 | 6 | 2 | 1 | -3/4 | 35/16 | 129/56 | 95/56 | 4 |
| 22 | 7 | 2 | 1 | -4/5 | 11/5 | 83/36 | 61/36 | 4 |
| 23 | 8 | 2 | 1 | -5/6 | 53/24 | 203/88 | 149/88 | 4 |
| 24 | 9 | 2 | 1 | -6/7 | 31/14 | 30/13 | 22/13 | 4 |
| 25 | 10 | 2 | 1 | -7/8 | 71/32 | 277/120 | 203/120 | 4 |
| 26 | 11 | 2 | 1 | -8/9 | 20/9 | 157/68 | 115/68 | 4 |
| 27 | 12 | 2 | 1 | -9/10 | 89/40 | 351/152 | 257/152 | 4 |
| 28 | 13 | 2 | 1 | -10/11 | 49/22 | 97/42 | 71/42 | 4 |

FIG. 11

DIGITAL SCALING

FIELD

The present invention is in the field of digital data. More particularly, the present invention relates to methods and arrangements to scale digital data.

BACKGROUND

Many wave forms may be digitized. The waveforms may be sampled or measured over regions, and values generated for the regions based upon the measurements. The values may be converted to binary numbers by grouping them into ranges, and representing the ranges by digital numbers. For example, sound waves may be digitized by measuring the magnitude of the waves at intervals and converting the measurements to binary numbers. Similarly, an image may be digitized by capturing the irradiance produced by the surface of the image and measuring the irradiance over small areas called pixels.

One type of digital imaging is medical imaging. Waves may be generated which pass through a human body or a tissue sample. Digital data representing images of the interior of the sample may be created by measuring the waves and performing calculations based upon the measurements. In some cases, the machine doing the measuring also creates the waves. For example, X-ray machines and CT scans produce X-rays which penetrate the body. Similarly, ultrasound machines produce high-intensity sound waves which penetrate the body. In other cases, ingested matter produces the waves. For example, ingested radioactive material may decay, producing gamma waves or other radioactive waves.

Television is another kind of digital imaging. The images may be broadcast interleaved. An image may be divided into lines. For example, standard definition television displays consist of 525 lines. In an interleaved broadcast, the image is broadcast in halves or fields. Each field consists of every other line, and the two fields together contain all of the lines in the image on the display. For example, one field may contain the odd-numbered lines and the next field may contain the even-numbered lines.

The digital data may be presented to reproduce the original wave form. For example, digital audio may be converted back to audio waves. Pixels may be displayed in a monitor or television screen. The quality of reproduction of a digital wave form during the presentation of the digital data may depend on the resolution, the number of data points. Two existing methods to improve resolution may be ineffective. The first method increases the data by increasing the number of samples or measurements taken. Samples may be taken more frequently, in the case of sound, or over smaller areas in the case of images. More generally, the region over which the wave form is sampled may be decreased. Increasing the samples may prove expensive. The smaller samples may require more sophisticated equipment to take more frequent samples or samples over small physical regions. Further, the additional sampling produces additional data. Working with the additional data may require additional storage, more powerful processing capabilities, and more broadband to transport the data. In the case of medical imaging, the increased resolution may require more intense or longer application of radiation, which may harm patients.

A second method may use computation to interpolate calculated points between the measured data points. The source input points (A, B, C, . . . ) are retained in the output and intervening point values (ab, bc, . . . ) are interpolated using a variety of techniques from simple linear interpolation, to more complex mathematical curve fitting algorithms. In two-dimensional applications (such as image processing), the computations may use interpolation along both axes to better approximate intervening data point (pixel) values. This interpolation is carried out along both axes concurrently to provide a best surface fit to the scaled data.

Common two-dimensional interpolation algorithms include nearest neighbor, bilinear interpolation, bicubic interpolation, spline curve fitting, and sparse point filtering. Various curve approximation techniques (bicubic, Catmull-Rom, etc.) are used in spline approaches. Windowed filtering techniques apply various filters such as Gaussian, or sinc based functions (Lanczos filters). Most of the effort in computational approaches may be directed to improvements in specific curve fitting algorithms in spline approaches, and to filter design in spatial filtering approaches. These concurrent interpolation approaches may be extended to three-dimensional applications by adjusting weighting functions, curve fitting algorithms and spatial filters.

The quality (accuracy) of the scaled output is proportional to the suitability of the specific interpolation algorithm applied to the input data points to arrive at intervening point values. Higher quality results may require more sophisticated interpolation methods (splines and spatial filtering) and may thus increase computation complexity. In many applications, such as digital cameras, the quality of the scaled output may be sacrificed in order to reduce computational loads.

SUMMARY OF THE INVENTION

The problems identified above are in large part addressed by methods and arrangements to process digital data. One embodiment provides a method to process digital data. The digital data may contain values, representing quantities of a wave form over regions. The method may include dividing one of the regions, where one of the values represents a quantity of a wave form over the region. The method may include assigning a value to each of the subregions. The average of the values of the subregions, weighted by the measures of the subregions, may approximately equal the value of the region.

BRIEF DESCRIPTION OF THE DRAWINGS

Advantages of the invention will become apparent upon reading the following detailed description and upon reference to the accompanying drawings in which like references may indicate similar elements:

FIGS. 8A, 8B and 8C depict the subdivision of a two-dimensional region by successive subdivisions along one-dimensional axes;

FIG. 11 charts the results of exemplary calculations of values for subintervals using the derivative migration method.

DETAILED DESCRIPTION OF EMBODIMENTS

The following is a detailed description of embodiments of the invention depicted in the accompanying drawings. The embodiments are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods and arrangements to process digital data are contemplated. The digital data may contain values, representing quantities of a wave form over regions. Embodiments include transformations, code, state machines or other logic to process digital data by dividing one of the regions, where one of the values represents a quantity of a wave form over the region. The embodiments may include assigning a value to each of the subregions. The average of the values of the subregions, weighted by the measures of the subregions, may approximately equal the value of the region. The digital data may constitute audio. The regions may represent time intervals and the values may represent the intensity of sound waves over the time intervals. The digital data may constitute images. The regions may comprise pixels and the values of the pixels may represent the intensity of light waves over the pixels. The embodiments may include the processing of digital data in cameras, televisions, audio players, seismic devices, and medical imaging devices. The subdivision of regions and the assignment of value to the subregions may utilize derivative migration.

While specific embodiments will be described below with reference to particular circuit or logic configurations, those of skill in the art will realize that embodiments of the present invention may advantageously be implemented with other substantially equivalent configurations.

Figure 1:
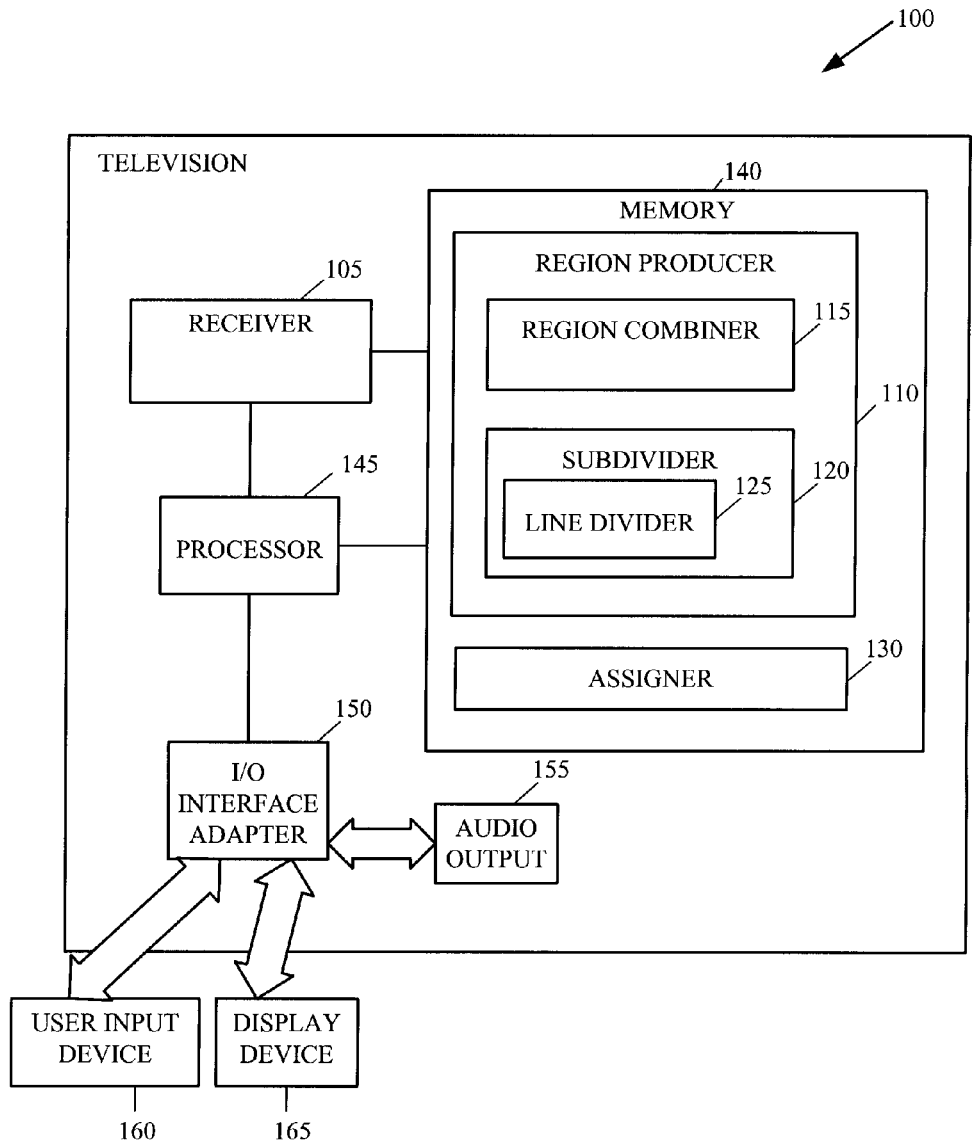
FIG. 1 depicts an embodiment of a television.

FIG. 1 depicts an embodiment of a television 100. The television 100 includes a receiver 105, a memory 140, a processor 145, an input/output interface adapter 150, an audio input 155, a user input device 160, and a display device 165. Television 100 may receive a broadcast containing pixels describing images to be displayed on display device 165.

Receiver 105 may receive TV broadcasts. The broadcasts may contain images and audio to be presented on the display device 165 and the audio output 155. The images may be broadcast interleaved. An image may be divided into lines. For example, standard definition television displays consist of 525 lines. In an interleaved broadcast, the image is broadcast in halves or fields. Each field consists of every other line, and the two fields together contain all of the lines in the image on the display (a frame). For example, one field may contain the odd-numbered lines and the next field may contain the even-numbered lines. The receiver 105 may be a device to capture a signal transmitted through the air, such as rabbit ears, or to receive a signal transmitted through cable, such as a cable box.

Memory 140 contains region producer 110 and assigner 130. Memory 140 may include volatile memory, non-volatile memory, or a combination of both. Region producer 110 may contain instructions for creating regions of display of the images to be shown on a television screen. The region producer 110 contains region combiner 115 and subdivider 120. Region combiner 115 may combine pixels from multiple lines of an image into a single region. More specifically, region combiner 115 may combine pixels from two consecutive lines into a single region. For example, region combiner 115 may combine a pixel on one line and another pixel vertically aligned with the first pixel on a neighboring line, either directly above or below it, to form a two-pixel region.

Region subdivider 120 may subdivide regions of pixels. The regions may be those created by region combiner 115. Region subdivider 120 includes line divider 125. Line divider 125 may divide multiple-line regions of pixels into single-line regions of pixels. Assigner 130 may assign values to the regions created by region combiner 115 and subdivider 120. Assigner 130 may base the values assigned to a region on the values assigned to neighboring regions. As one example, assigner 130 may assign a value to region formed from a group of pixels by averaging the values of the pixels. As another example, for an interleaved broadcast, assigner 130 may assign a value to a region containing pixels on consecutive lines by averaging the values of the pixels in the region contained in the current field and the values of the pixels in the region contained in the previous field. Alternatively, in this situation, assigner 130 may average the values of the pixels contained in the current field that are in the consecutive lines or are in lines adjacent to the consecutive lines. For example, suppose that the region comprises pixels from lines 1 and 2, and the current field contains lines 1 and 3. Assigner 130 may assign a value to the region based upon the values of pixels in lines 1 and 3.

Together, region producer 110 and assigner 130 may transform the digital data for a field, or half a frame, into the data for a complete frame. This transformation may enable the de-interlace of the display into a progressive scan frame. This transformation may also enable the display of twice as many frames per second, resulting in increased clarity of display. Further, a similar transformation may enable simultaneously double the frame rate and de-interlace the frames into a progressive scan. The display of additional frames may also eliminate motion blur caused by the time difference between the interlaced fields. In interlaced broadcasting, half the lines are captured a fraction of a second later than the other half. In addition, the transformation may be carried out without an upstream change in the television broadcast.

I/O interface adapter 150 implements user-oriented I/O through, for example, software drivers and computer hardware for controlling output to display devices such as display device 165 and audio output device 155 as well as user input from user input device 160. User input device 160 may consist of buttons or dials attached to the television, a remote control device which contain buttons, or a combination of both. Audio output 155 may include speakers or headphones. Display device 165 may consist of a LCD display, an LED display, or a cathode ray tube display.

The television of FIG. 1 is for explanation and not for limitation. Devices capable of receiving broadcasts, subdividing regions comprising the broadcasts, and assigning values to the subregions, with the average of the values over the region, weighted by the measures of the regions, approximately equal to the value of the entire region may include home entertainment centers, combinations of televisions and computers, DVD players, set top boxes (cable and satellite) and other systems that receive broadcasts as would occur to those of skill in the art.

Figure 2:
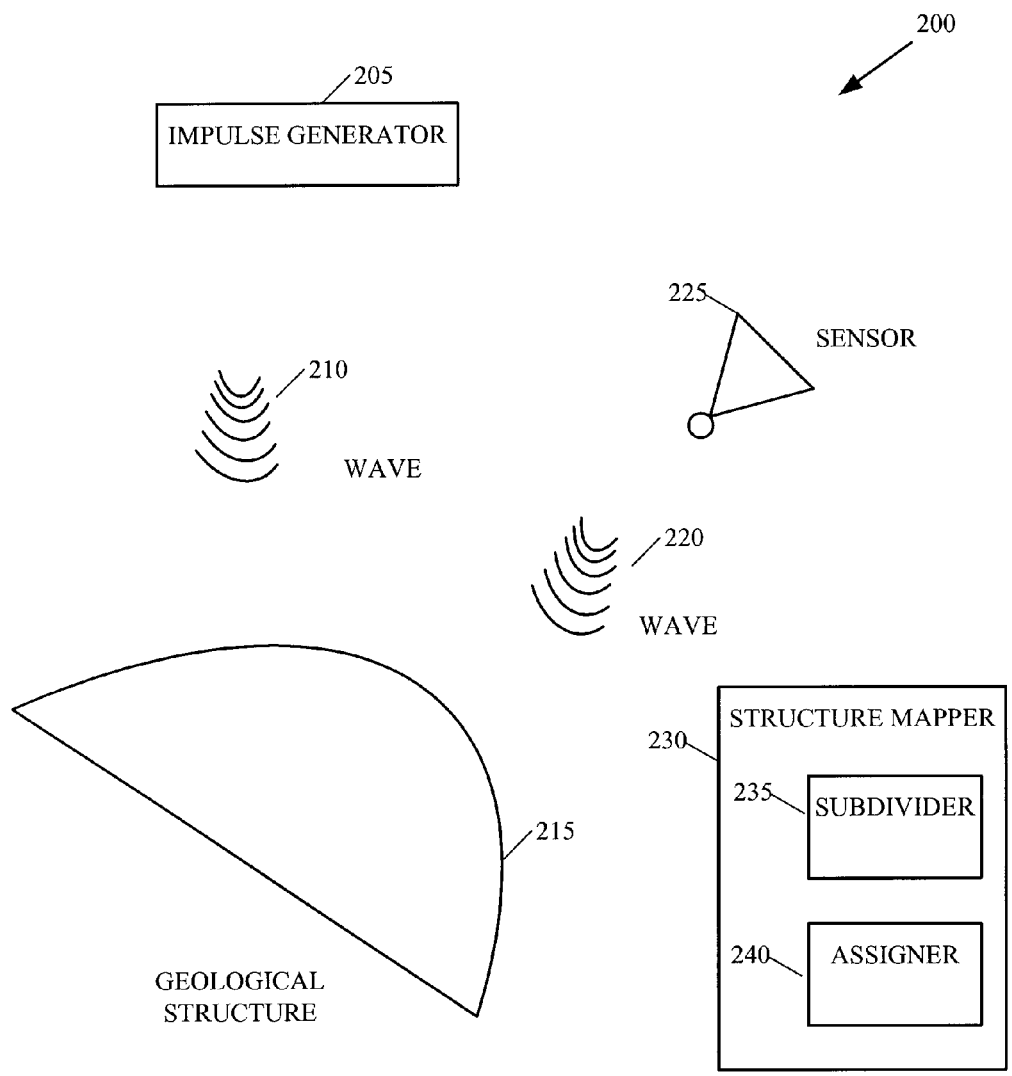
FIG. 2 depicts an embodiment of a system for seismic exploration.

Turning to FIG. 2, depicted is an embodiment of a system for seismic exploration 200 that includes an impulse generator 205, a sensor 225, and a structure mapper 230. System 200 may create shock waves that travel through the earth's subsurface (seismic waves). The system 200 may detect the reflection of the seismic waves from rock layers and other structures underneath the earth's surface and may interpret measurements of the seismic waves to form a map of the earth's subsurface.

Impulse generator 205 may generate a shock, thereby producing seismic waves. Impulse generator 205 may consist of a variety of devices that may generate seismic waves, including:

a compressed air gun, which shoots pulses of air into the water. A compressed air gun may be suitable for the exploration of underwater earth formations.

a thumper truck, which slams a heavy plate into the ground.

explosives. They may be inserted in a borehole over land, or thrown into the water and exploded.

sparkers. An electrical discharge between two electrodes inserted into water produces an explosive formation of steam.

boomers. A metal plate is explosively repulsed from a coil by passing a high voltage through the coil.

pingers, which generate acoustic pulses.

Impulse generator 205 may produce a single impulse or operate continuously. For example, under the continuous seismic profiling method, a ship may travel along a line, emitting a series of acoustic pulses. In addition, impulse generator 205 may operate in a single location or multiple locations. For example, an explosive may be detonated in a single borehole, or in multiple boreholes.

A shock wave generated by impulse generator 205 may produce a seismic wave 210. The wave may travel beneath the earth's surface and may be reflected by subsurface structures such as geological structure 215. The reflected wave 220 may be detected by sensor 225. Sensor 225 may consist of a hydrophone to detect the reflected wave 220 over water or a geophone or seismometer to detect the reflected wave 220 over land. Sensor 225 may detect ground movement (vibration) or sound or another aspect of reflected wave 220. Sensor 225 may consist of a single sensor or multiple sensors. For example, a ship performing seismic exploration may string together 3000 hydrophones over a 3000 meter length. The reading or readings may be collected and transmitted to structure mapper 230.

Structure mapper 230 may process digital data representing waves received from geological regions such as geological structure 215 by one or more sensors such as sensor 225. Structure mapper 230 may interpret the measurements of reflected seismic waves to produce a geological subsurface map showing structural features. The interpretation may be based upon the differences in speed of the passage of seismic waves through different regions of the subsurface. In some embodiments, structure mapper 230 may represent the map as digital values, with the values representing lighting intensity over a small region of display or pixel. For example, a common resolution for a computer monitor is 1024 by 768 pixels; that is, the monitor will display 1,024 pixels on each of its 768 lines of display.

Structure mapper 230 includes subdivider 235 and assigner 240. Subdivider 235 may divide regions represented by the values of digital data into subregions and assigner 240 may assign values to the subregions. The values assigned to the subregions, weighted by the areas of the subregions, may equal the values of the subdivided regions. The regions may represent the receipt of seismic waves from portions of geological structures by a sensor, may represent pixels comprising a map of the geological structures, or may represent other digital data generated in seismic exploration.

The system of FIG. 2 is for explanation and not for limitation. In alternative embodiments, systems for geological exploration may omit an impulse generator. They may passively detect phenomenon providing information on subsurface structures without first exciting seismic waves or otherwise acting. In further embodiments, the systems may rely on different sorts of detectors rather than seismic wave detectors. For example, passive seismic systems may detect the smell of hydrocarbons; or may measure gravitational pull, magnetic flux density, magnetic radiation, or electrical resistance or conductivity.

Figure 3:
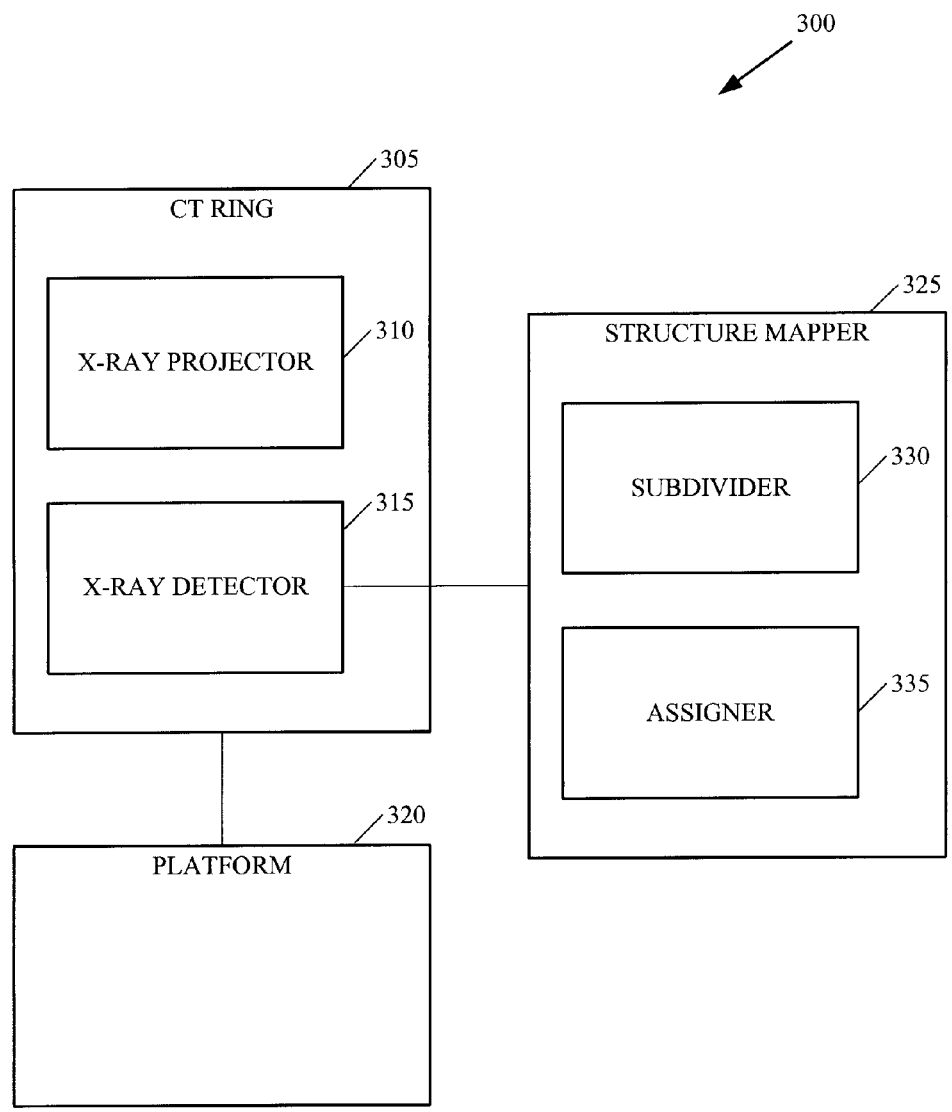
FIG. 3 depicts an embodiment of a medical imaging device.

FIG. 3 depicts an embodiment of a medical imaging device 300 which includes a computed tomography (CT) ring 305, a platform 320, and a structure mapper 325. A medical imaging device may produce images of human bodies and body parts, including tissues and organs, for clinical diagnosis, medical research, or other purposes. The embodiment of FIG. 300 comprises a CT scan. CT scan 300 takes X-rays of sections or slices of a portion of the body and combines the X-rays of the slices into an overall image of the portion of the body.

CT ring 305 includes X-ray projector 310 and X-ray detector 315. CT ring 305 may consist of a ring-shaped structure with a central opening through which platform 320 may pass. X-ray projector 310 projects X-rays through objects, and X-ray detector 315 measures the X-rays after their passage through the objects. Platform 320 may hold a human body or other object for examination. As an object on platform 320 passes through CT ring 305, X-ray projector 310 and X-ray detector 315 may revolve. As a result, CT ring 305 may take X-ray pictures of slices of the object. The pictures for each slice may show a complete 360° view of the slice. In some embodiments, X-ray projector 310 may vary the intensity of the radiation during the scanning to produce the best image with the least radiation.

Structure mapper 325 may combine the slices of an object into a detailed three-dimensional image of a body. Structure mapper 325 may represent the images in digital form as a series of binary numbers representing the energy intensity or other descriptors of tiny volume elements or voxels. A voxel is one of the tiny volumes that make up the representation of images in computer memory. Structure mapper 325 includes subdivider 330 and assigner 335. Subdivider 330 may divide the voxels into subregions or subvoxels. Assigner 335 may assign values to the subregions, representing the energy intensity of the subregions or subvoxels. Similarly, subdivider 330 and assigner 335 may subdivide regions representing portions of slices of the object and may assign values to the subregions, or may subdivide other regions with values which represent other data generated during a CT scan. The voxels of a three-dimensional image may be transformed into two-dimensional pixels in order to display the image on a two-dimensional screen by slicing the image along various axes or planes.

The subdivision of the voxels or other regions and the assignment of values to the subvoxels or other subregions may enable a depiction of the images with higher resolution. The higher resolution may produce clearer images without undue delay or increased sampling. In the medical imaging field, the avoidance of increased sampling may be particularly important. Building equipment capable of the additional sampling may significantly increase the costs of already very expensive medical imaging equipment. Further, the increased sampling may increase the amount of radiation to which a body is subjected, increasing the risks of damage.

FIG. 3 is for illustration and not limitation. In alternative embodiments, devices other than CT scans may perform medical imaging. Techniques for medical imaging include X-ray, ultrasound, magnetic resonance imaging (MRI), diffuse optical imaging, electrical impedance tomography, positron emission tomography (PET), Single Photon Emission Computed Tomography (SPECT), and other techniques as may occur to those of skill in the art.

PET and SPECT are similar. A subject may ingest a radioactive substance. Particles emitted by its decay may excite atoms in the object to be examined. For example, the decay may produce gamma waves which collide with atoms in object. PET and SPECT devices may detect the excitement of the atoms and map the detections into images. In SPECT, each collision may produce a single photon. In a PET scan, the radioactive decay may cause the emission of positrons that can then collide with electrons, producing gamma ray photons. In this nuclear reaction, two gamma rays result and are paired such as to move away from the nuclide in exactly opposite directions. Both gamma photons are sensed simultaneously by detectors 180° apart. This double set of radiation photons may improve the resolution of SPECT scans as compared with PET scans.

In the remaining techniques, fields are projected onto the subject, and detectors measure the impact of the fields on the subject and convert the measurements into images. In X-ray techniques, as in CT scans, X-rays are projected and detected. In ultrasound, ultrasonic pressure waves are projected against the body. Echoes inside the tissue are detected. MRI uses magnets to excite hydrogen nuclei in water molecules contained in human tissue. Diffuse optical imaging uses infrared light and measures the optical absorption of the light by hemoglobin. The absorption is dependent upon the oxygenation status of the hemoglobin. In electrical impedance tomography, currents are applied to the surface of the skin, and the conductivity of the skin is measured.

Some of the above techniques may be combined with further processing to improve the imaging or detect other images. In elastography, tissue images are taken before and after compression, and the images compared. In general, cancerous tissue may be stiffer than regular tissue, and may react differently to compression. The images may be produced by MRI, ultrasound, or other techniques. In fluoroscopy, a patient may ingest a contrast medium, such as barium or iodine. The imaging may show the working of internal organs.

Medical imaging may produce two-dimensional or three-dimensional images. Three-dimensional images may be created by taking a series of images of two-dimensional slices of the target and combining the images. This technique is called tomography. The imaging may be still or over time. For example, fluoroscopy, PET scans, and SPECT scans may take a series of images of organs as they are working.

Figure 4:
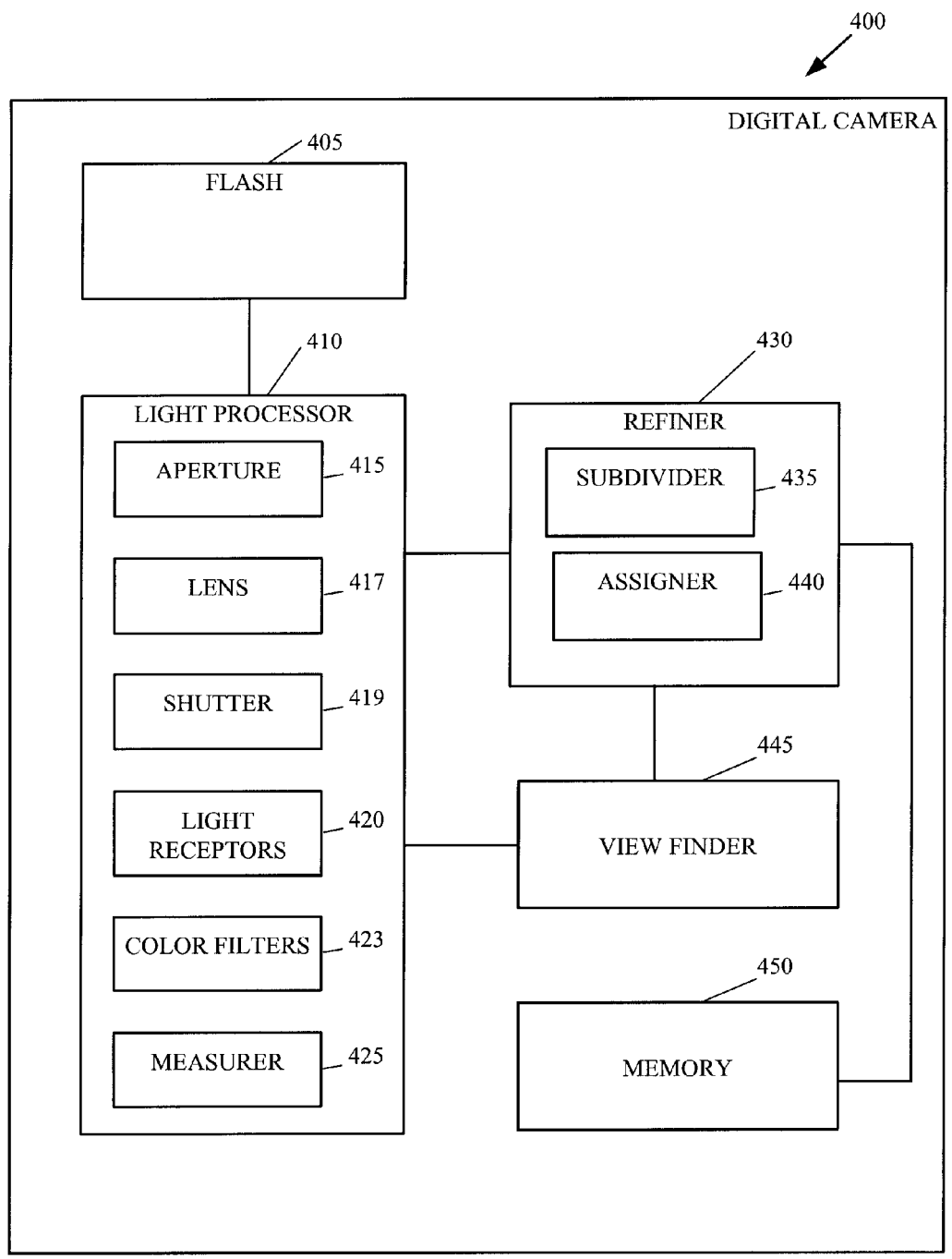
FIG. 4 depicts an embodiment of a digital camera.

Turning to FIG. 4, depicted is an embodiment of a digital camera 400 which includes a flash 405, a light processor 410, a refiner 430, a view finder 445, and a memory 450. Light receptor 410 may receive light from a scene, measure the intensity, and convert the results to digital data. Light receptor 410 includes aperture 415, lens 417, shutter 419, light receptors 420, color filters 423, and measurer 425. Aperture 415 is the opening through which light passes to the light receptors 420. Lens 417 focuses the digital camera 400 and shutter 419 controls the passage of light through the aperture. When a user presses on the shutter release, the lens 417 may focus on the scene and the digital camera 400 may take a reading of the available light. If the light is dim, the digital camera 400 may activate the flash 405 to add illumination. The digital camera 400 may also reset the light receptors 420. Light may then pass through the lens 417 and aperture 415 into the light receptors 420. The shutter 419 may then close.

Light receptors 420 may measure the intensity of light and convert the values into digital data. Common light receptors include charge coupled devices (CCD) and complementary metal oxide semiconductors (CMOS). Each is made up of many very small light-sensitive diodes called photosites, each of which samples light over a region called a pixel. A 5 megapixel camera may capture the intensity of light at 5 million pixels.

The light receptors on a black-and-white camera may measure the total intensity of light. A color camera may use color filters 423 to separate the light into colors. Many digital cameras use red, green and blue filters. Some digital cameras use cyan, yellow, green and magenta filters. Other digital cameras may use other filtering schemes. Digital cameras may use a variety of schemes for matching up the color filters with the light. One method splits a beam of light into colors, and sends each color to a corresponding filter. Another method rotates the filters. For example, each color may be captured one-third of the time that a picture is being taken. In a third method, the color filters are divided among the pixels. With this method, each pixel captures only one color value. A CCD photosite may capture color according to this method. This method may create a mosaic-like pattern, as illustrated by diagram 1200 of FIG. 12. In diagram 1200, for example, light filters may cause pixels 121 and 123 to receive only green light and pixels 122 and 124 to receive only blue light.

Measurer 425 may measure the intensity of light at each pixel. In a color camera, measurer 425 may measure the intensity of each of the filtered colors. The separate values for the separate colors are called channels. In diagram 1200 of FIG. 12, for example, measurer 425 may measure the intensity of green light at pixels 121 and 123, and the intensity of blue light at pixels 122 and 124. Refiner 430 includes subdivider 435 and assigner 440. Subdivider 435 may divide pixels or other regions of a picture into subpixels or other subregions and assigner 440 may assign values to the subpixels or other subregions, representing the light intensity of the subregions. The subdivision of the pixels and assignment of values to the subpixels may enable a depiction of the images with higher resolution. In many embodiments, refiner 430 may operate on the assignment of color to pixels. For example, under the rotating filter method of capturing color, the light for different colors is captured at slightly different times. A region representing a pixel during a time interval may be divided by subdivider 435 into subregions, representing the pixel during subintervals of the time interval. Assigner 440 may assign the subintervals values for the color so that the average of the values of the subintervals over the whole interval is the original value during the interval.

Figure 12:
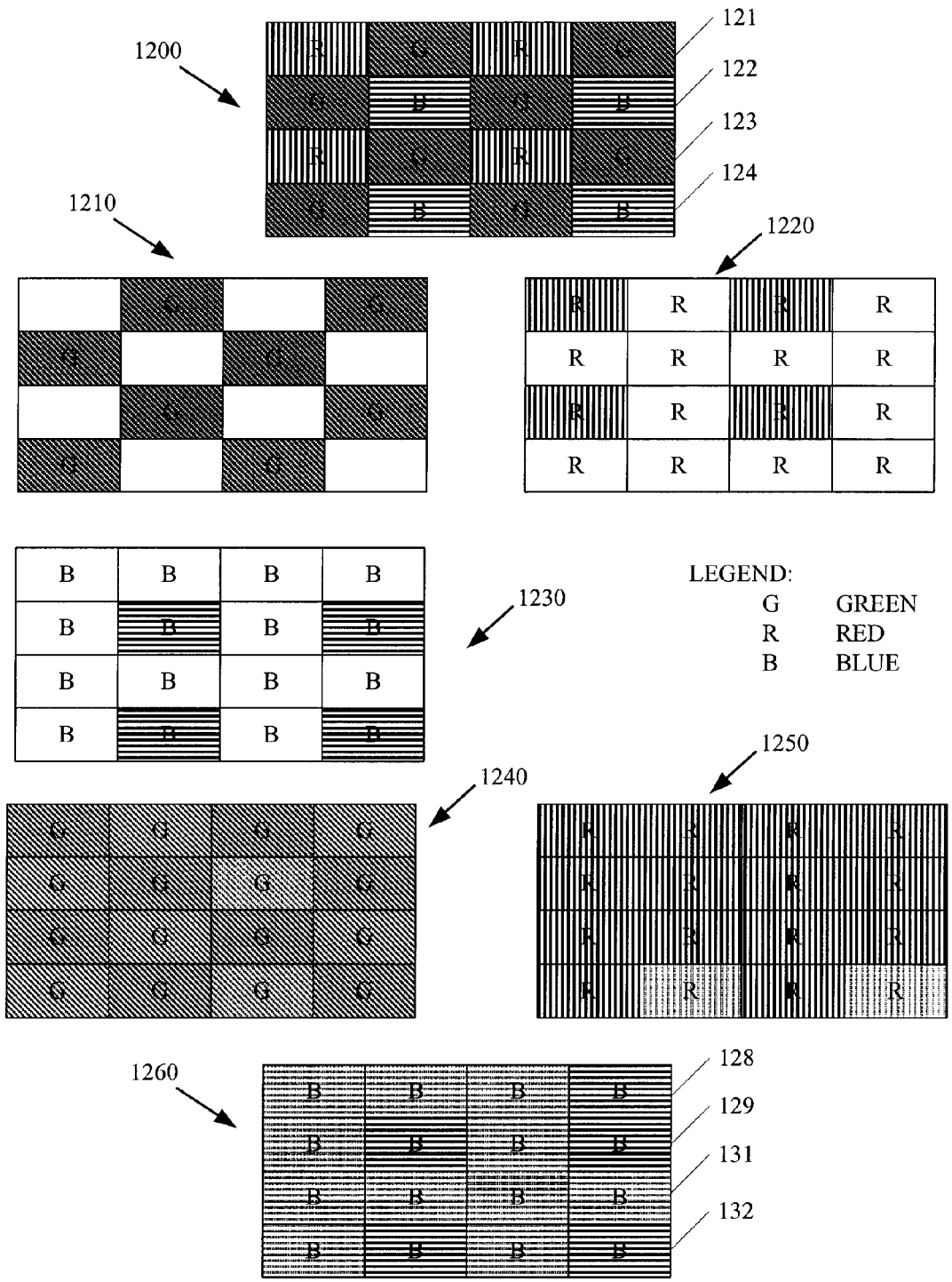
FIG. 12 depicts separating pixels of similar colors into channels and resampling the channels.

In digital cameras with each pixel assigned only one color value as in diagram 1200 of FIG. 12, subdivider 435 may divide regions representing pixels and multiple channels into subregions representing the pixels with a single color or channel ("de-mosaic" the channels), and assigner 440 may resample the channels to assign a value for each color for each subregion. Diagrams 1210, 1220 and 1230 illustrate dividing up a region to demosaic it by dividing the pixels of similar colors into channels. Each of regions 1210, 1220 and 1230 represents a single color or channel. Region 1210 may be assigned values representing green, region 1220 may be assigned values representing red, and region 1230 may be assigned values representing blue. Regions 1240, 1250 and 1260 represent resampling the channels to assign the values of the color to each pixel. For example, assigner 440 from FIG. 4 may assign the pixels of region 1260, such as pixels 128, 129, 131, and 132, values representing the light intensity of blue light. Assigner 440 from FIG. 4 may assign the values by determining an overall intensity of blue light for region 1260 and assigning the values to the pixels, such as pixels 128, 129, 131, and 132, so that the average intensity of blue light over the pixels is equal to the determined overall intensity of blue light for region 1260. After the resampling, refiner 430 may combine the regions 1240, 1250 and 1260 to produce a region of a color image in which each pixel has three channels.

Returning to FIG. 4, refiner 430 may also implement digital zoom. Digital cameras may provide for optical zoom, implemented by an optical zoom lens; and digital zoom, implemented by calculation. In digital zoom, the pixels making up a portion of an area of display may be transformed into pixels making up the entire area of display. Refiner 430 may implement digital zoom by dividing pixels into subpixels, assigning values of light intensity to the subpixels of a pixel so that the average intensity of the subpixels is the intensity of the pixel, and expanding the subpixels to the size of the original pixels.

View finder 445 may display a scene. In some embodiments of digital cameras, the view finder 445 may display a scene before a picture is taken. In other embodiments, the view finder 445 may display a picture after it has been taken. In still other embodiments, the view finder 445 may display both scenes before the taking of a picture and the results of taking a picture. In a few embodiments, the view finder 445 may display images in black and white. In many embodiments, the view finder 445 may provide a color image.

Memory 450 may store the digital data representing an image. Memory 450 may be volatile or non-volatile. In many digital cameras, memory 450 may be a removable device similar to flash memory.

The digital and components illustrated in FIG. 4 are for explanation, not for limitation. Digital cameras may omit some of the illustrated components or may include additional components. For example, in some embodiments, digital cameras may be capable of taking video. Video digital cameras (also known as video camera recorders or camcorders) may take pictures similarly to still digital cameras, but may take 30 or more pictures (frames) per second. The frames represent light intensity over a time interval. The pictures are converted into digital data and stored in a device which may operate similar to a video camera recorder. Video digital cameras may store the video in digital tape format, DVD format or CD format. In several further embodiments, a refiner may increase the frame rate. The refiner may subdivide a pixel or group of pixels of a frame representing the light intensity over a time interval into multiple frames, representing light intensity over shorter time intervals. The refiner may assign values to the subdivisions of the frame so that the average intensity over the subdivisions is equal to the intensity of the pixel in the original frame. In some further embodiments, video cameras may operate to de-mosaic and resample color values. In many further embodiments, video cameras may implement digital zoom. By similar methods, video cameras may increase the image size. In other embodiments, the digital camera might be part of another device such as, for example, a video cellular phone.

Figure 5:
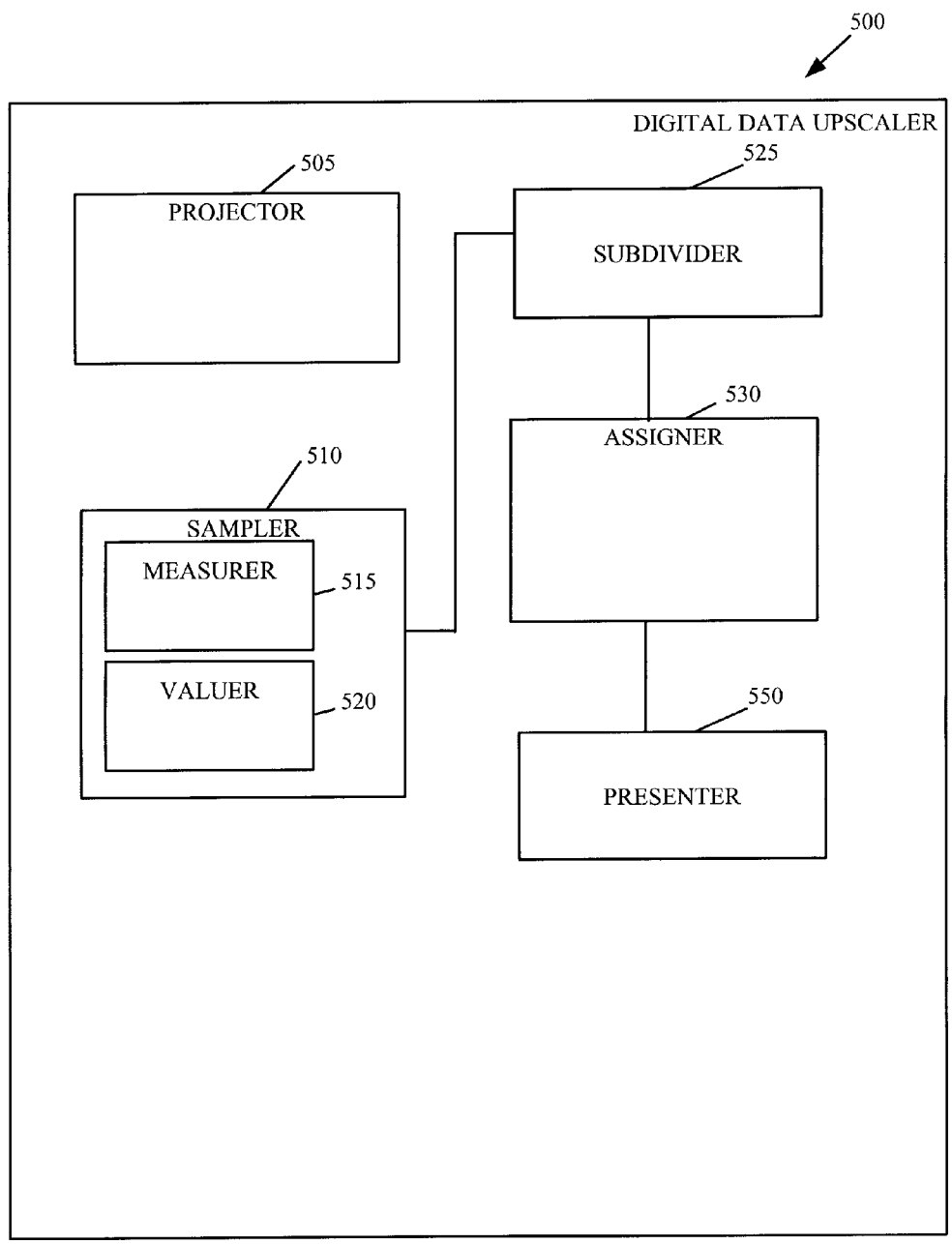
FIG. 5 displays an embodiment of a digital data upscaler.

FIG. 5 displays an embodiment of a digital data upscaler 500. Digital data upscaler 500 includes a projector 505, a sampler 510, a subdivider 525, an assigner 530, and a presenter 550. Projector 505 may project waves onto an object. Modulations of the waves from impinging upon the object may be measured and converted into digital data. For example, medical imaging devices may emit X-rays, a type of electro-magnetic wave, or ultrasound. The flash of cameras may emit light. Seismic devices may cause shock waves.

Sampler 510 may sample and measure waves traveling from an object. Sampler 510 includes measurer 515 and valuer 520. Measurer 515 may measure the intensity of the wave over a region. The region is dependent upon the nature of the digital data. For still images, the regions consist of pixels, small areas which may represent light captured by single photosites or light sensors. For video, a region may consist of a pixel in a frame, representing light during a short interval of time. The video may consist of multiple frames per second. For sound, a region represents an interval of time, and the data represents the intensity of a sound wave at the interval of time. Different devices may be used to measure different types of waves. For example, photosites may measure the intensity of light, microphones may measure the intensity of sound, and geophones or hydrophones may measure the vibrations produced by seismic waves.

Measurer 515 may produce a single value per region, or multiple values (channels). For example, digital data representing a color image may contain values for the multiple colors for a region, with the measuring colors together forming all colors. Filters may be used to produce the separate colors. Common filtering schemes may include red, green, and blue or cyan, yellow, green, and magenta.

Valuer 520 may divide the measured intensity of the wave into ranges and assign a digital number to each range. For example, to digitize sound, a sound wave may be converted to an electrical wave by a microphone. An analog to digital converter (ADC) may encode the intensity of the electrical wave as an 8-bit number by dividing the amplitude of waves into 256 ranges. For each sample of the electrical wave, the ADC may determine the range in which the wave amplitude falls. For example, an 8-bit ADC may find that successive amplitudes fall into the range of 128, 135, and 180 in successive samples. The ADC may return the numbers 128, 135, and 180 as the value of those samples. Similarly, if the amplitude is encoded as a 16 bit number, representation as one of 65,566 amplitude values would be possible. Choosing a different number of bits in this way can improve the amplitude precision as more bits are used, at the cost of transmitting more data.

Subdivider 525 may subdivide the regions over which the magnitudes of waves were measured to provide values. The division depends upon the nature of the region. For example, pixels may be divided into subpixels, time intervals for sound processing may be subdivided into subintervals, and pixels in a frame may be divided into subpixels or pixels in a frame of shorter duration or both. The division may be into halves or other fractions. There may be one division or multiple divisions. For example, an interval may be divided into quarters by dividing it into halves and by further dividing each half into halves.

Assigner 530 may assign values to the subregions so that the average of the values of a subregion is approximately equal to the value of the original region. Assigner 530 may include a processor and memory. In some embodiments, assigner 530 and subdivider 525 may constitute part of an apparatus for processing digital data, such as a camera. In alternative embodiments, assigner 530 and subdivider 525 may be separate from a sampler and projector. A service may, for example, provide the processing. In such as case, assigner 530 and subdivider 525 may be components of a computer.

Presenter 550 may display images, play audio, or otherwise present the digital data, including the values generated by assigner 530. Presenter 550 may consist of a screen on a medical imaging device, a view finder on a camera, a screen on a video player or slide projector, a computer monitor, an LCD or LED display, or a microphone.

FIG. 5 is for illustration and not limitation. Digital data upscalers may omit some of the components shown or add others as may occur to those of skill in the art. In some embodiments, a projector may be omitted. For example, some seismic devices are passive. They only detect and do not produce shock waves. In some embodiments, a presenter may be omitted. In addition to the embodiments described above, including devices to receive broadcasts, seismic devices, medical imaging devices, and cameras, digital data upscalers may include devices capable of executing programs to subdivide regions and assign values to the subregions such as computing devices that deal with images, media players that play streaming video from disk files or the Internet, and other devices as may occur to those of skill in the art.

Figure 6:
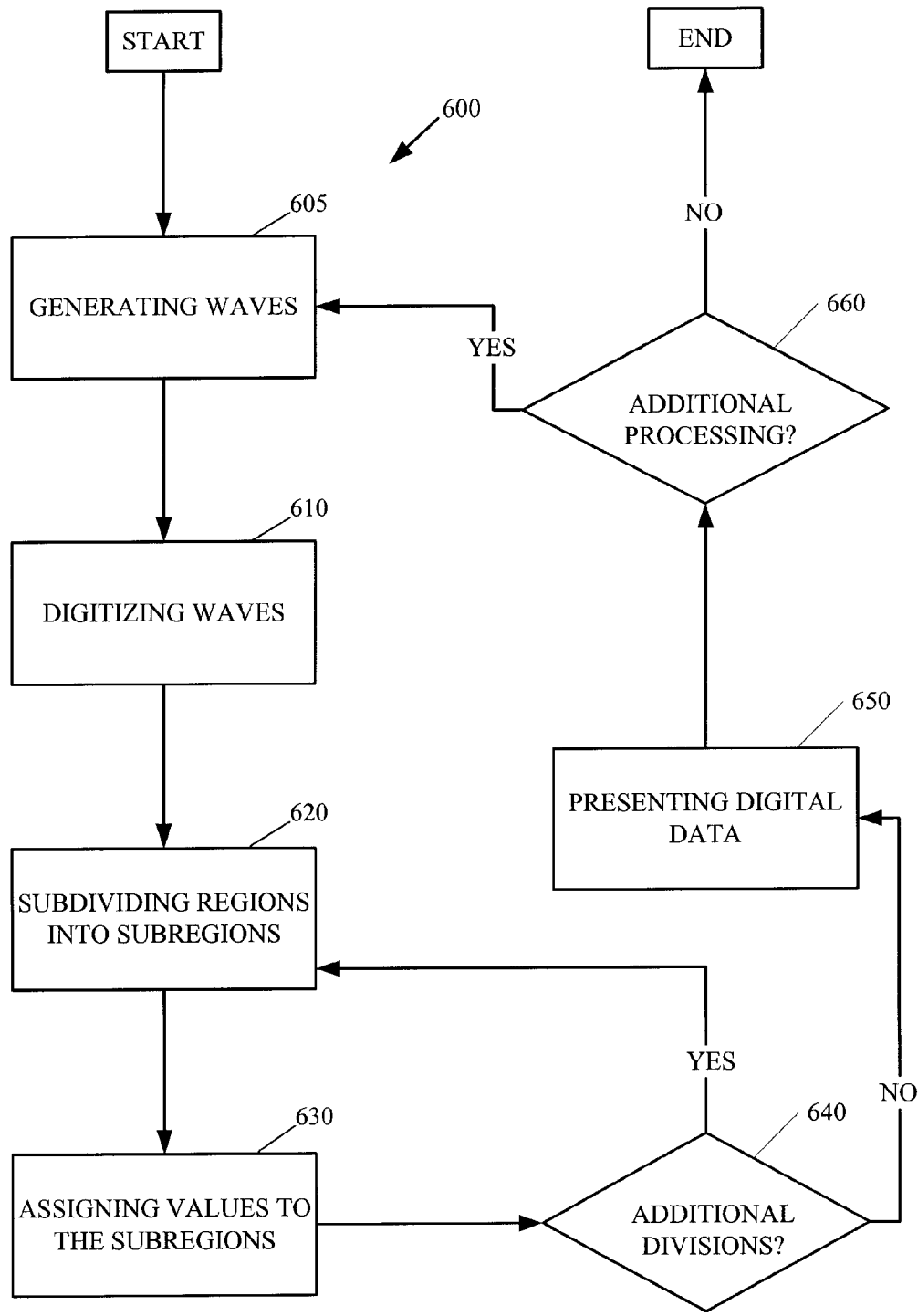
FIG. 6 depicts a flowchart of an embodiment to process digital data.

FIG. 6 depicts a flowchart of an embodiment to process digital data. Flowchart 600 of FIG. 6 may begin with generating waves (element 605) which are to be sampled and converted into digital data. In some embodiments, the waves may generated by the equipment that is processing digital data. For example, an X-ray machine or CT scan may generate electromagnetic waves which include X-rays. Similarly, in seismology, a system may create shock waves. In other embodiments, the waves may be generated by a phenomenon to be represented. For example, a musician may generate sound waves and an image may emit light waves.

The waves may be digitized (element 610). The waveforms may be sampled or measured over regions, and values generated for the regions based upon the measurements. The value of a region may represent an average of a quality of the wave form over the region, such as the average intensity of light over a pixel or the average magnitude of a sound wave over an interval of sampling. The values may be converted to binary numbers. The possible values may be assigned ranges, and the ranges represented by digital numbers. For example, sound waves may be digitized by measuring the magnitude of the waves at intervals of time and converting the measurements to binary number. Similarly, images may be digitized by capturing the irradiance produced by the surface and measuring the irradiance over small areas called pixels.

Regions may also represent both space and time. For example, a video camera may record frames, images of a space over a fraction of a second of time. A region may represent the intensity of light over a small area at small interval of time. In multiple 3D scans, a region may represent a volume element (voxel) at an interval of time. Regions may also consist of channels of data that represent various attributes of the image. For example, color images may have channels for the intensity of red, green, and blue (RGB) at each pixel location. Alternatively, the channels may represent the hue, saturation, and luminance (HSL) at each pixel location, or HSL and transparency. From another perspective, however, the color images may be regarded as two-dimensional regions with multi-dimensional values. The value of a pixel (two-dimensional region) is a vector with a component for each channel.

The regions may be divided into subregions (element 620). One-dimensional regions or intervals may be divided into subintervals; for example, into equal halves. Multiple-dimensional regions, such as squares or rectangles, may be divided among each dimension separately as illustrated in FIGS. 8, 8B, and 8C. FIG. 8A depicts a two-dimensional region 101. In FIG. 8B, the region is divided into subregions along the horizontal axis. The horizontal axis of region 101 is divided into two halves, producing the two subregions 102 and 103. In FIG. 8C, the two subregions of FIG. 8B are divided into subregions along the vertical axis, which is halved. Subregion 102 of FIG. 8B is divided into the two subregions 104 and 106, and subregion 103 of FIG. 8B is divided into the two subregions 107 and 108. The successive divisions among the axes result in the division of region 101 of FIG. 8A into the four subregions (104, 106, 107, and 108) of FIG. 10C. Similarly, a 3-dimensional region may be divided among each of the three dimensions separately. In alternative embodiments, a multi-dimensional region may be divided into subregions in one step. For example, a two-dimensional region may be divided into quarters, with each quarter having half the length and half the width of the original region.

Similar techniques may be used to subdivide other types of regions. For example, regions consisting of channels may be subdivided separately for each channel. In the alternate perspective, however, the region is a two-dimensional region and may be subdivided among the physical dimensions as illustrated in FIGS. 8A, 8B, and 8C. Similarly, regions consisting of frames may be divided along the time dimension. This division may result in a video stream with an increased frame rate. Regions consisting of frames of voxels may be subdivided along the time dimension, along any space dimension, or along combinations of time and space dimensions.

Figure 7A:
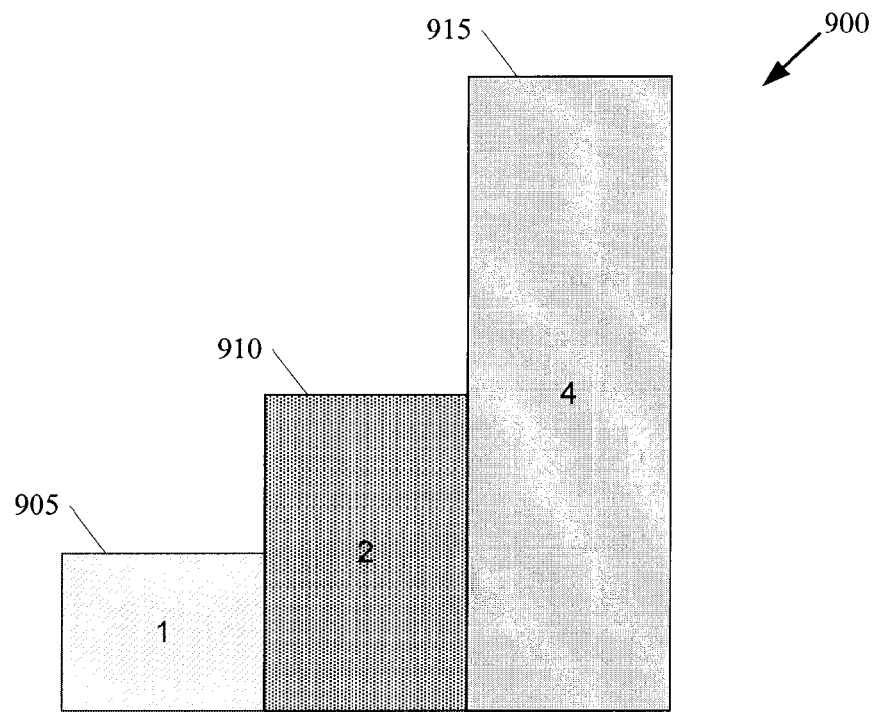
FIGS. 7A and 7B depict bar graphs of an exemplary decomposition of regions.
Figure 7B:
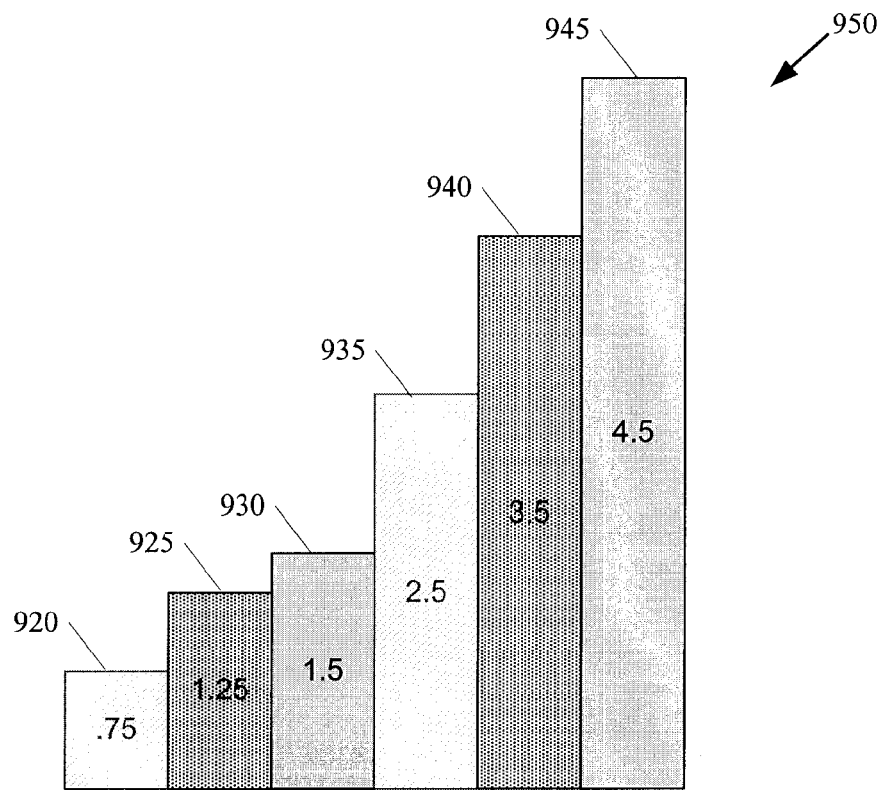

Returning to FIG. 6, flowchart 600 includes assigning values to the subregions (element 630). The values may be assigned so that the average of the values over the subregions is approximately equal to the original value of the region. As a result, the decomposition process is reversible. None of the subregions, however, need to be assigned the value of the original region. Each can have a different value. Turning to FIGS. 7A and 7B, illustrated is the division of regions and the assignment of values to the subregions. In the case of FIGS. 7A and 7B, the regions are intervals. Bar graph 900 of FIG. 7A consists of three regions, region 905 with value 1, region 910 with value 2, and region 915 with value 4. In bar graph 950 of FIG. 7B, each region of FIG. 7A is divided into two subregions. Bar graph 950 includes regions 920 and 925, subdivisions of region 905; subregions 930 and 935, subdivisions of region 910; and subregions 940 and 945, subdivisions of region 915. The average of the values of the subregions of a region is equal to the value of the original region. For example, the average value of the subregions of region 910 is 2, the average of 1.5 and 2.5; and 2 is the value of region 910.

Many methods may be used to assign values to the subregions. When the regions consist of intervals, one method is to assign a value based on the value of the region and the neighboring regions. For example, if B is the value of a region, and A and C are the values of neighboring regions, the left subregion of B may be assigned the value $$B + \frac{A-C}{6}$$

and the right subregion $$B + \frac{C-A}{6}.$$

This method may be used to produce the assignment of values to the subregions 930 and 935 of region 910.

For regions consisting of intervals, one method of assigning values to subregions or subintervals consists of selecting a suitable function and integrating it over the subregions. The value assigned to each subregion is the integral of the function over the subregion. For purposes of the following discussion assume that the value of the region under consideration is B, and that A and C are the values of the neighboring regions. As in FIG. 7A and FIG. 7B, the interval may be decomposed into two equal sub-intervals The subintervals may be placed along the x axis, and a coordinate system may be applied such that:

$$-1.0 \leq x \leq 1.0 \quad [1]$$

The first subinterval is represented by $-1.0 < x < 0.0$; and the second subinterval is represented by $0.0 < x < 1.0$.

A function f may be selected whose average value over the interval is the original value assigned to the interval:

$$B = 1/2 \int_{-1}^{1} f(x) dx, \quad [2]$$

where B is the value of the region

Under these conditions, $$b1 = \int_{-1}^{0} f(x) dx \text{ and} \quad [3]$$

$$b2 = \int_{0}^{1} f(x) dx$$

where b1 is the value assigned to the first subregion and b2 is the value assigned to the second subregion. From [2], it follows that $$\frac{b1 + b2}{2} = B \quad [4]$$

In other words, the average of the values over the subintervals is equal to the original value.

For an interval with a different coordinate system, a function f may be selected whose average value over the interval is the original value assigned to the interval:

$$B = 1/\mu \int_{-1}^{1} f(x) dx,$$

where B is the value of the region and $\mu$ is a measure of the region.

Under these conditions, $$b1 = 1/\mu1 \int_{-1}^{0} f(x) dx \text{ and}$$

$$b2 = 1/\mu2 \int_{0}^{1} f(x) dx$$

where b1 is the value assigned to the first subregion, $\mu1$ is a measure of the first subregion, b2 is the value assigned to the second subregion, and $\mu2$ is a measure of the second subregion. It follows that $$\frac{b1 \times \mu1 + b2 \times \mu2}{\mu} = 1/\mu1 \int_{-1}^{0} f(x) dx \times \mu1/\mu + 1/\mu2 \int_{0}^{1} f(x) dx \times \mu2/\mu =$$

$$\int_{-1}^{0} f(x) dx/\mu + \int_{0}^{1} f(x) dx/\mu = 1/\mu \int_{-1}^{1} f(x) dx = B$$

In other words, the values over the subintervals weighted by the measures of the subintervals is equal to the original value of the interval.

The function f may be selected to be linear on the subinterval $[-1\ 0]$ and on the subinterval $[0, -1]$. Define $y_1$ as f(-1), $y_2$ as f(0), and $y_3$ as f(+1). In one embodiment, f may be defined on the endpoints of the original interval as follows:

$$y_1 = (A+B)/2 \quad [5]$$

$$y_3 = (B+C)/2 \quad [6]$$

To satisfy equation [2], the value of f at the midpoint of the original interval is calculated as follows:

$$y_2 = 2B - \frac{y_1 + y_3}{2} \quad [7]$$

For this choice of f, $b_1 = B+(A-C)/8$ and $b_2 = B+(C-A)/8$.

In alternative embodiments, other linear functions may be selected satisfying equation [2]. For example, f may be assigned values at the endpoints of the original interval so that the extension of the line segments representing f to the midpoints of the neighboring regions has the values of those neighboring regions. In other words, a value for $y_2$ is calculated and $y_1$ is determined so that the three points:

$$(-2, A), (-1, y_1) \text{ and } (0, y_2)) \quad [7A]$$

are collinear. Similarly, a value for $y_3$ is determined so that the three points (2, C), (1, $y_3$)(0, $y_2$) are collinear.

Figure 10:
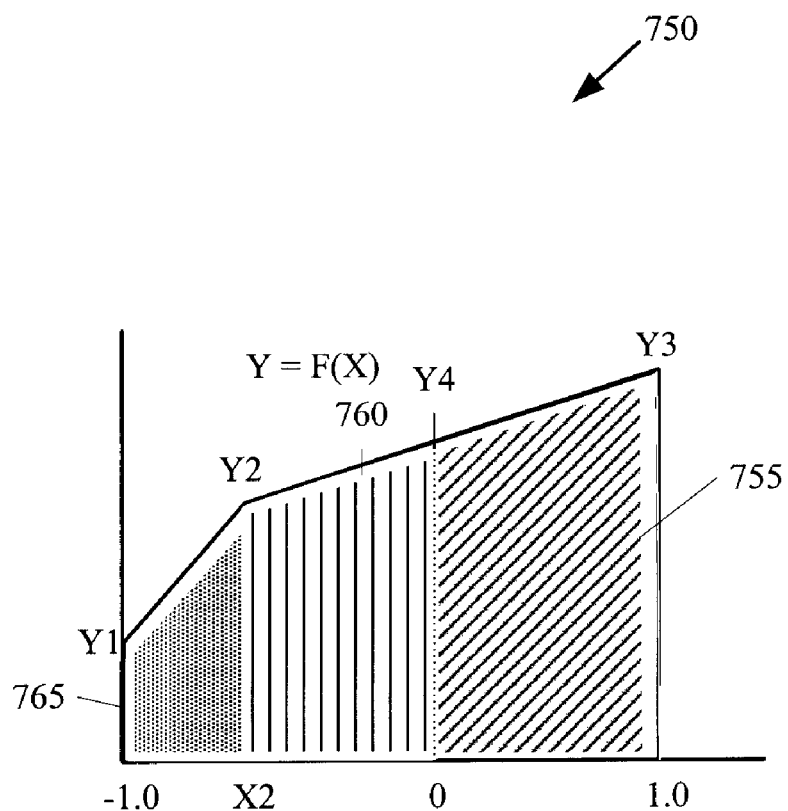
FIG. 10 depicts a graph of an exemplary function constructed by derivative migration.

In the approach of the previous two paragraphs, the inflection point of f, the x-coordinate of the point at which the two line segments making up f meet, is 0, the midpoint of the original interval. In alternative embodiments, the inflection point may be moved along the x-axis to take into account more rapid change of f in one direction rather than the other. The process of moving the inflection point along the x-axis to reflect the differing values of the derivative of f is called derivative migration. FIG. 10 illustrates a graph 750 of an exemplary function f which may have been constructed by derivative migration. In graph 750, the two line segments making up the graph of f meet at the point ($x_2$, $y_2$). The x-coordinate, $x_2$, is not the midpoint 0 of the interval $[-1, +1]$ on which f is defined. Thus, in graph 750, the inflection point has migrated from the midpoint. Derivative migration may improve the accuracy of interval decomposition.

Figure 9:
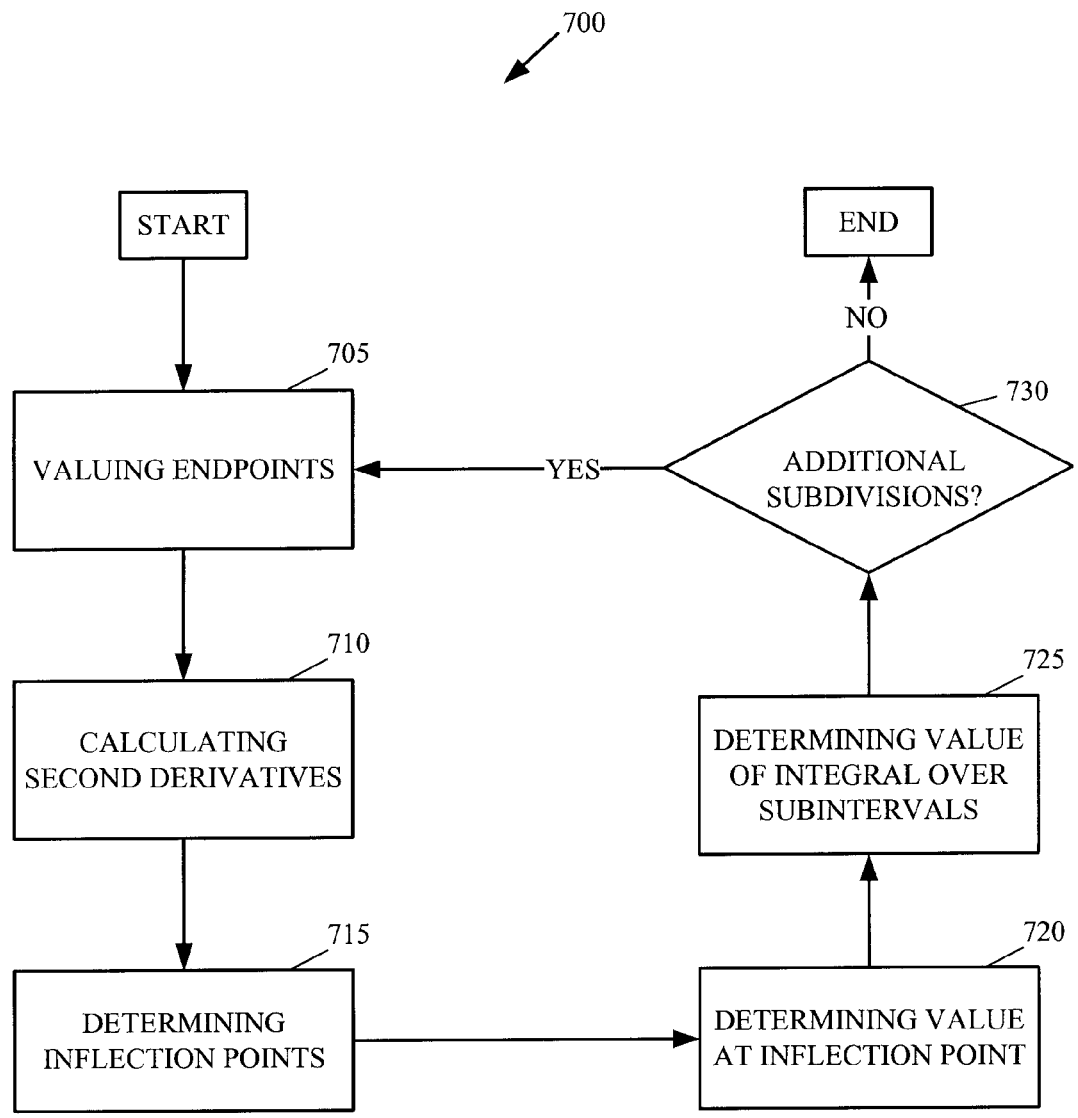
FIG. 9 depicts a flowchart of an embodiment of the assignment of values to subintervals using the derivative migration method.

Turning to FIG. 9, shown is a flowchart 700 of the assignment of values to subintervals using the derivative migration method. Flowchart 700 includes assigning values of f at the endpoints of the original interval (element 705). These endpoints may be assigned as by equation [5] and equation [6]. Derivative migration also includes calculating the second derivative, the differing values of the derivative of f (element 710). For derivative migration, only the absolute magnitude of the derivatives is necessary. Hence:

$$df(x1)/dx = d1$$

$$d1 = |A - B| \quad [8]$$

$$df(x2)/dx = d2$$

$$d2 = |B - C| \quad [9]$$

Derivative migration also includes calculating an inflection point based upon the values of the derivatives (element 715). In one embodiment of the application of derivative migration, the value of the inflection point $x_2$ is defined as:

$$x_2 = \begin{cases} 1.0 - \dfrac{d_1}{d_2}, & d_2 > d_1 \\ \dfrac{d_2}{d_1} - 1, & d_1 > d_2 \\ 0, & d_1 = d_2 \end{cases} \quad [10]$$

If $d_2$ is greater than $d_1$, the value of the inflection point $x_2$ will be positive, and if $d_1$ is greater than $d_2$, the value of the inflection point $x_2$ will be negative.

Using [2], [5], [6], [8], [9], and [10], the value of $y_2 = f(x_2)$ may be derived (element 720):

$$y_2 = 2B - y_1(1+x_2)/2 + y_3(1-x_2)/2 \quad [11]$$

The value of y2 is dependent on the migrated value of $x_2$, which improves the accuracy of the subinterval values b1 and b2.

Substituting known values into the above formulae, the values of b1 and b2 may be calculated (element 725). Returning to FIG. 10, the graph 750 of the function f shows that the values of f at $-1$, $x_2$, $0$, and $+1$ respectively are $y_1$, $y_2$, $y_4$, and $y_3$. The graph 750 also includes three shaded regions 755, 760, and 765. The value of b1 is the area under the function f bounded by the lines $x=-1$ and $x=0$, the sum of the areas of regions 765 and 760. The area of region 765 is $$A_{765} = (x_2+1)(y_1+y_2)/2,$$

that is, the base times the average height. Similarly, the area of region 760 is:

$$A_{760} = (-x_2)(y_2+y_4)/2.$$

The value of $y_4$ may be calculated from the equation of a straight line:

$$y_4 = y_2 + (y_3 - y_2)(-x_2)/(1-x_2).$$

Similarly, the value of b2 is the area under f bounded by the lines $x=0$ and $x=1$, the area of region 755. The area may be calculated by:

$$A_{755} = (y_3+y_4)/2, \quad [11a]$$

that is, the length of the base, which is 1, times the average height or simply the average height. Alternatively, the calculations may be simplified by using equation [11a] to calculate b2 and the equation:

$$b1 = B - b2 \quad [11b]$$

to calculate the value of b1. Similarly, if the function f is linear (not piecewise linear) on the subinterval $[-1, 0]$, then b1 may be calculated by an equation similar to [11a] and b2 may be calculated by an equation similar to equation [11b]. Returning to FIG. 9, if there are additional subdivisions to be performed and additional subintervals to be assigned values (element 730), elements 705 to 725 may be repeated. Otherwise, the application of derivative migration may end.

Turning to FIG. 11, chart 1100 shows the results of exemplary calculations of values for the left and right subintervals of an interval using the derivative migration method described above. The columns of chart 1100 present the values of three neighboring intervals, labeled A, B, and C. The derivative migration method is applied to the middle interval, which is assumed to be $[-1, +1]$. The columns of chart 1100 also present the location of the inflection point $x_2$ on the interval $[-1, +1]$, the value $y_2$ of the function f on the inflection point, the value b1 assigned to the left subinterval $[-1, 0]$ of the interval $[-1, +1]$, the value b2 assigned to the right subinterval of the interval $[-1, +1]$, and the total of the values of the subintervals. The total is presented as a check on the correctness of the calculations. The totals should equal twice the value B of the interval $[-1, +1]$. In rows 1 and 2 of chart 1100, the value of B is equal to the value of one of the neighboring intervals. In that case, the inflection point is moved all of the way over to the opposite side of the interval $[-1, +1]$, and the two subintervals are each assigned the value B. In row 1, B=A, and the inflection point is moved to +1. In row 2, B=C, and the inflection point is moved to $-1$.

In rows 3 through 8, the inflection point is 0, the midpoint of the interval $[-1, +1]$, because $|A-B|=|B-C|$. In other words, the derivative is equal on both sides of the interval $[-1, +1]$. In addition, both the left and right subinterval are assigned the value 1, the same value as the original interval.

Rows 9 through 18 of chart 1100 illustrate the derivative migration method for a higher derivative to the right than to the left. As the row number increases, the derivative to the right gradually increases, and the derivative to the left remains constant. As the derivative increases, the inflection point moves closer and closer to the edge of the interval $[-1, +1]$. In row 9, the inflection point is at ½. It increases to ⅔ and ¾ in rows 10 and 11, and eventually reaches ¹⁰⁄₁₁ in row 18. Despite the large increase in the value of C, the value of the function f at the inflection point changes only slightly. The value increases from 17/8 or 2.125 in row 9 to 49/22 or 2.227 in row 18. The change of values of the subintervals is even slighter. The value b1 of the left interval decreases from approximately 1.71 to approximately 1.69 as C changes from 4 to 13 and the value b2 of the right interval increases from 2.29 to 2.31.

Rows 19 through 28 of chart 1100 illustrate the derivative migration method for a higher derivative to the left than to the right. The values presented in rows 19 through 28 are symmetric with those in rows 9 through 18. For corresponding rows, the values of A and C are switched, as are the values of the left and right subintervals. The inflection point for rows 19 through 28 is the same distance from the leftmost point of the interval $[-1, +1]$ as the inflection point for rows 9 through 18 is from the rightmost point of the interval $[-1, +1]$. For example, ½ in row 9 is the same distance from 1 as $-½$ in row 19 from the point $-1$. As shown by chart 1100, as the row number and the derivative to the right increase, the inflection point $x_2$ moves closer and closer to $-1$, the left edge of the interval $[-1, +1]$; the value assigned to the right subinterval decreases from approximately 1.71 to approximately 1.69; and the value assigned to the left subinterval increases from 2.29 to 2.31.

The implementation of the derivative migration method presented above is for illustration and not example. In other embodiments, different techniques may be used to assign values to subintervals of an interval based upon the difference in the derivatives to the left and right of the interval. In some further embodiments, the techniques may produce the same results as indicated above. For example, an alternative method of calculation may be based on calculus. The calculus approach is based on equation [2]. Returning to FIG. 10, the function f can be described as two separate linear functions $y = f_1(x)$ from $-1$ to $x_2$; and $y = f_2(x)$ from $x_2$ to $+1$. The generalized equation for a linear function is defined as:

$$f(x) = mx + n \quad [12]$$

The integral of a linear function is defined as:

$$\int_j^k f(x)\,dx = [(mx_k^2/2) + nx_k] - [(mx_j^2/2) + nx_j] \quad [13]$$

For $f_2(x)$ in FIG. 10:

$$m = [(B+C)/(2-x_2)] \quad [14]$$

$$n = Y_4 \quad [15]$$

$$x_k = +1 \quad [16]$$

$$x_j = 0 \quad [17]$$

The value of b2 is the area under $f_2(x)$ which is equal to the area of region 755. Substituting [16] and [17] into [13], the area of region 755 may be calculated as:

$$A_{755} = (m/2) + n \quad [18]$$

Substituting [14] and [15] into [18], the value of b2 becomes:

$$b2 = [(B+C)/2(2-x2)] + Y_4 \quad [19]$$

and from [4]:

$$b1 = 2B - b2 \quad [20]$$

In some embodiments, the values of b1 and b2 may be obtained from the use of tables. The values may be calculated according to the above methods or other methods and stored in tables. An embodiment using tables may generate all possible A, B, and C, values and the corresponding b1 and b2 results, and store the results in a table. Further embodiments which obtain the same values as the above derivative migration calculation may use symmetry to reduce the table size. For example, assume 8-bit digital data, where the values range from 0 to 255. Only results for B=0 to 127 need to be stored. Values for B=128 to 255 may be obtained from values for B=0 to 127 by the equations:

$$b1(-A,-B,-C) = -b1(A,B,C) \text{ and}$$

$$b2(-A,-B,-C) = -b2(A,B,C).$$

In other words, to obtain the values of b1 and b2 for values of A, B and C where B is negative, first obtain the values of b1 and b2 for −A, −B and −C (where −B is positive). Then, take the negative of those values of b1 and b2. Further, the A to C values are the mirror image of the C to A values. Thus, only values of A, B, and C for which C is less than or equal to A need be stored. As a result, for 8-bit digital values, the table size of around 4 megabytes may be sufficient. Once the table has been generated, the computation of particular values for subintervals is trivial. The computation is simply a table lookup.

In some alternative embodiments, the techniques used to assign values to the subintervals may produce different results. For example, a different calculation may be made for the endpoints of the function f. In particular, the technique described in [7A] on page 21 may be used. As another example, a different calculation may be used to determine the inflection point. As a specific example, the inflection point may be calculated by $$x_2 = 2d_2/d_1 + d_2 - 1, d_1 \text{ and } d_2 \text{ not both } 0.$$

This formula moves the inflection point away from the midpoint of an interval slightly less than the formula of equation [10]. For example, applying this formula to the data in row 9 would place the inflection point at ⅓ instead of ½; and applying the formula to the data in row 16 would place the inflection point at ⁸⁄₁₀ rather than ⁹⁄₁₀.

Returning to FIG. 6, the flowchart 600 includes checking whether to further subdivide the region (element 640). A multi-dimensional region, which has been subdivided among some of the dimensions, may be further divided among other dimensions. For example, a two-dimensional region such as a pixel that has been subdivided along the horizontal axis may be divided among the vertical axis. The assignment of values may be independent of the order of the subdivisions. For example, returning to FIG. 8A and 8C, the four subregions (104, 106, 107, 108) may be produced by either dividing region 101 horizontally and then vertically, or by dividing region 101 vertically and then horizontally. The assignment of values may produce the same results in both cases.

In addition, a subregion may be further divided to increase the resolution of the digital data. For example, an interval may be divided into half three times to increase the resolution by eight-fold. If further subdivision is indicated, elements 620 through 630 may be repeated. Otherwise, in some embodiments, the subregions may be aggregated to achieve the desired resolution. For example, to achieve three-fold resolution, an interval may be subdivided into two subintervals, and the subintervals divided into four subintervals, $I_{11}$ through $I_{14}$. These four subintervals may be aggregated into three, $I_{21}$ through $I_{23}$. $I_{21}$ may be formed from $I_{11}$ and the first third of $I_{11}$, $I_{22}$ may be formed from the last ⅔rds of $I_{12}$ and the first ⅔rds of $I_{13}$ and $I_{23}$ may be formed from the last third of $I_{13}$ and from $I_{14}$.

After refining the values of the digital data, the digital data may be presented (element 650). The form of presentation depends upon the type of digital data. Digital data representing the intensity of sound waves may be presented by converting the digital data to sound by a process similar to the inverse of the conversion of the original sound waves into digital data. Depending upon the type of images, digital data representing images may be presented by displaying the images on a monitor, on a television set, on a cell phone, on medical imaging equipment, on a laser or inkjet printer, or on other equipment for the display of images from digital values. Other types of digital data may be displayed on other types of equipment. If there is additional processing, such as collecting more digital data, elements 605 through 650 may be repeated. Otherwise, the processing of digital data may end.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product for processing digital data accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

It will be apparent to those skilled in the art having the benefit of this disclosure that the present invention contemplates methods and arrangements to process digital data. It is understood that the form of the invention shown and described in the detailed description and the drawings are to be taken merely as examples. It is intended that the following claims be interpreted broadly to embrace all the variations of the example embodiments disclosed.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method to process digital data, the method comprising:
    receiving digital data comprising values, the values assigned to regions and representing quantities of a wave form over the regions;
    selecting a region of the regions, wherein the region is assigned a value of the digital data;
    dividing the region into a plurality of subregions; and
    assigning a value to each of the plurality of subregions, wherein the average of the values of the subregions, weighted by measures of the subregions, is approximately equal to the value of the region, thereby increasing the number of data points of the digital data, wherein assigning a value to a subregion comprises assigning a value based upon the value of the region and the value of neighboring regions, wherein:
    the region comprises an interval;
    the plurality of subregions comprise a first and a second subinterval of the interval;
    the neighboring regions comprise a first and a second neighboring region, wherein the first neighboring region neighbors the first subinterval and the second neighboring region neighbors the second subinterval; and
    assigning a value to each subregion comprises assigning a value to each subregion based upon the value of the region and values of the neighboring regions, and
    wherein assigning a value to each subregion based upon the value of the region and values of the neighboring regions comprises:
    selecting a function f piecewise linear over the subregions; and
    assigning to each subregion an integral of f over the subregion divided by a measure of the subregion, wherein a value of an integral of f over the region divided by a measure of the region is approximately equal to the value of the region.

2. The method of claim 1, further comprising:
    dividing a subregion of the plurality of subregions into sub subregions; and
    assigning a value to each sub subregion, wherein the average of the values of the sub subregions, weighted by measures of the sub subregions, is approximately equal to the value of the subregion.

3. The method of claim 2, wherein:
    the region comprises a portion of a plane;
    dividing the region into the plurality of subregions comprises dividing the portion of the plane along a first line through the plane;
    dividing the subregion into sub subregions comprises dividing the subregion along a second line through the plane, the second line not parallel to the first line; and
    assigning a value to each subregion and sub subregion comprises weighting the subregions and sub subregions by the areas of the subregions and sub subregions.

4. The method of claim 3, wherein dividing the region into subregions and dividing the subregion into sub subregions comprise dividing the regions and subregions along perpendicular lines.

5. The method of claim 1, further comprising:
    combining all or a portion of the plurality of the subregions into a single region; and
    assigning a value to the single region based on the values of the all or a portion of the plurality of the subregions.

6. The method of claim 1, wherein:
    the regions comprise intervals;
    the dividing the region into the plurality of subregions comprises dividing an interval into subintervals, wherein no value of the digital data was assigned to a subinterval of the subintervals;
    the assigning a value to each subregion of the plurality of subregions comprises assigning a value to each subinterval of the subintervals; and
    the weighting the subintervals comprises weighting the subintervals by lengths of the subintervals.

7. The method of claim 1, wherein:
    the region comprises a rectangle;
    dividing a region into subregions comprises dividing the rectangle into sub rectangles along one or more lines parallel to one of the sides of the rectangle; and
    assigning a value to each subregion comprises weighting the sub rectangles by areas of the sub rectangles.

8. The method of claim 1, wherein dividing the region comprises dividing the region into equal halves.

9. The method of claim 1, wherein:
the region comprises an interval of time;
the value of the digital data represents the value of the wave form over the interval of time; and
dividing the region into subregions comprises dividing the interval of time into subintervals.

10. The method of claim 1, wherein:
the region comprises a frame;
the value of the digital data represents quantities of the wave form over an interval of time and a physical region; and
dividing the region into subregions comprises dividing the frame along the dimension of time.

11. The method of claim 1, wherein the assigning comprises:
selecting a function f integrable over the subregions and the region, wherein a value of an integral of f over the region divided by a measure of the region is approximately equal to the value of the region; and
assigning to each subregion a value of an integral of f over the subregion divided by a measure of the subregion.

12. The method of claim 11, wherein:
selecting a function f comprises selecting a function f defined along one dimension of the region; and
the value of the integral of f over a subregion is the value of the integral of f over the subregion along the dimension.

13. The method of claim 1, wherein:
assigning a value to each subregion based upon the value of the region and values of the neighboring regions comprises assigning the value $$B + \frac{(A-C)}{4}$$

to the first subinterval and the value $$B - \frac{(A-C)}{4}$$

to the second subinterval;
B is the value of the interval;
A is a value of the first neighboring region; and
C is a value of the second neighboring region.

14. The method of claim 1, wherein:
selecting a piecewise linear function comprises selecting a function f dependent upon a ratio, the denominator of the ratio dependent upon max(|A−B|,|C−B|) and the numerator of the ratio dependent upon min(|A−B|,|C−B|), wherein B is the value of the interval; A is a value of the first neighboring region; C is a value of the second neighboring region; not all of A, B, and C are equal; the function "max" returns the greater of its arguments and the function "min" returns the least of its arguments.

15. The method of claim 14, wherein the selecting comprises:
determining values of f at the endpoints of the interval, the values a linear combination of A, B, and C;
determining an inflection point of the interval, the inflection point dependent upon the ratio; and
determining a value of f at the inflection point, based upon the constraint that the integral of f over the interval is approximately equal to B.

16. The method of claim 1, wherein:
the value of the region comprises channels; and
assigning a value to each subregion comprises assigning a value comprising channels to each subregion.

17. A computer program product comprising a tangible computer-readable storage medium, wherein the storage medium does not comprise a transitory signal, the storage medium having a computer readable program, wherein the computer readable program when executed on a computer causes the computer to:
receive digital data comprising values, the values assigned to regions and representing quantities of a wave form over the regions;
select a region of the regions, wherein the region is assigned a value of the digital data;
divide the region into a plurality of subregions; and
assign a value to each of the plurality of subregions, wherein the average of the values of the subregions, weighted by measures of the subregions, is approximately equal to the value of the region, thereby increasing the number of data points of the digital data, wherein assigning a value to a subregion comprises assigning a value based upon the value of the region and the value of neighboring regions, wherein:
the region comprises an interval;
the plurality of subregions comprise a first and a second subinterval of the interval;
the neighboring regions comprise a first and a second neighboring region, wherein the first neighboring region neighbors the first subinterval and the second neighboring region neighbors the second subinterval; and
assign a value to each subregion comprises assigning a value to each subregion based upon the value of the region and values of the neighboring regions, and
wherein assigning a value to each subregion based upon the value of the region and values of the neighboring regions comprises:
selecting a function f piecewise linear over the subregions; and
assigning to each subregion an integral of f over the subregion divided by a measure of the subregion, wherein a value of an integral of f over the region divided by a measure of the region is approximately equal to the value of the region.

18. The computer program product of claim 17, wherein the computer readable program when executed on a computer further causes the computer to:
divide a subregion of the plurality of subregions into sub subregions; and
assign a value to each sub subregion, wherein the average of the values of the sub subregions, weighted by measures of the sub subregions, is approximately equal to the value of the subregion.

19. The computer program product of claim 17, wherein:
the region comprises a frame;
the value of the digital data represents quantities of the wave form over an interval of time and a physical region; and
dividing the region into subregions comprises dividing the frame along the dimension of time.

20. The computer program product of claim 17, wherein the assigning comprises:
selecting a function f integrable over the subregions and the region, wherein a value of an integral of f over the region divided by a measure of the region is approximately equal to the value of the region; and assigning to each subregion a value of an integral of f over the subregion divided by a measure of the subregion.

21. The computer program product of claim 17, wherein selecting a function f comprises selecting a function f piecewise linear over the plurality of subregions, wherein the value of f depends upon the value of the region and the value of neighboring regions.

22. The method of claim 11, wherein the selecting comprises selecting the
function f, wherein f is a continuous-valued function integrable over the plurality of subregions and the region.

23. The method of claim 11, wherein:
the region comprises an interval; and
the selecting comprises selecting the function f integrable over the interval.

24. The method of claim 1, wherein:
the region comprises an interval; and
the selecting comprises selecting the function f integrable over the interval.

25. The method of claim 1, wherein the selecting comprises selecting the
region, wherein no subregion of the region is assigned a value of the digital data.

26. The method of claim 25, wherein:
the regions comprise areas;
the values comprise pixels, wherein each pixel represents quantities of the wave form over an area;
the selecting the region comprises selecting an area of the areas, wherein no pixel of the digital data was assigned to a portion of the area;
the dividing the region comprises dividing the area into portions of the area; and
the assigning comprises assigning a pixel to each portion of the portions of the area.

27. The method of claim 10, wherein:
the values comprise pixels, wherein each pixel represents quantities of the wave form over an area during an interval of time;
the selecting the region comprises selecting a physical region during an interval of time,
wherein no pixel of the digital data was assigned to the physical region during a subinterval of the interval of time;
the dividing the region comprises dividing the physical region during the interval of time into the physical region during subintervals of the interval of time; and
the assigning comprises assigning a pixel to the physical region during each subinterval of the subintervals.

28. The method of claim 25, wherein:
the regions comprise areas with a single channel;
the values comprise pixels, wherein each pixel represents a single color of an area;
the selecting the region comprises selecting an area of the areas, wherein no pixel of the digital data was assigned to a portion of the area;
the dividing the region comprises dividing an area with a single channel into the area with multiple channels; and
the assigning comprises assigning a pixel to the area for each channel of the multiple channels.

29. The computer program product of claim 17, wherein the selecting comprises selecting the region, wherein no subregion of the region is assigned a value of the digital data.

30. The method of claim 11, wherein:
the region comprises an interval;
the value of the region is B;
the subregions comprise subintervals of the interval;
the method further comprises applying a coordinate system wherein the interval ranges from −1.0 to +1.0;
a first subinterval ranges from −1.0 to 0.0;
a second subinterval ranges from 0.0 to +1.0;

$$B = 1/2 \int_{-1}^{1} f(x)\,dx;$$

$$b1 = \int_{-1}^{0} f(x)\,dx; \text{ and} \quad [3]$$

$$b1 = \int_{0}^{1} f(x)\,dx,$$

wherein b1 is the value assigned to the first subinterval and b2 is the value assigned to the second subregion.

31. The method of claim 1, further comprising replacing the value of the
region with the values of the subregions.

32. A method to process digital data, the method comprising:
receiving digital data comprising values, the values assigned to regions and representing quantities of a wave form over the regions;
selecting a region of the regions, wherein the region is assigned a value of the digital data;
dividing the region into a plurality of subregions; and
assigning a value to each of the plurality of subregions, the assigning comprising:
selecting a function f integrable over the subregions and the region, wherein a value of an integral of f over the region divided by a measure of the region is approximately equal to the value of the region ; and
assigning to each subregion a value of an integral of f over the subregion divided by a measure of the subregion, wherein the average of the values of the subregions, weighted by measures of the subregions, is approximately equal to the value of the region, thereby increasing the number of data points of the digital data, wherein:
the region comprises an interval;
the plurality of subregions comprise a first and a second subinterval of the interval;
the neighboring regions comprise a first and a second neighboring region, wherein the first neighboring region neighbors the first subinterval and the second neighboring region neighbors the second subinterval;
assigning a value to a subregion comprises assigning a value based upon the value of the region and the value of neighboring regions; and
the selecting comprises selecting the function f, wherein f is piecewise linear over the interval.

* * * * *